(12) United States Patent
Klassen et al.

(10) Patent No.: US 8,850,343 B2
(45) Date of Patent: *Sep. 30, 2014

(54) USER INTERFACE METHODS AND APPARATUS FOR CONTROLLING THE VISUAL DISPLAY OF MAPS HAVING SELECTABLE MAP ELEMENTS IN MOBILE COMMUNICATION DEVICES

(71) Applicant: BlackBerry Limited, Waterloo (CA)

(72) Inventors: Gerhard Dietrich Klassen, Waterloo (CA); Tatiana Kalougina, Waterloo (CA); Shual S Wisebourt, Waterloo (CA); Peter John Devenyi, Waterloo (CA); Jesse Boudreau, Ottawa (CA); Eric Johnson, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,324

(22) Filed: Feb. 5, 2013

(65) Prior Publication Data

US 2013/0147713 A1 Jun. 13, 2013

Related U.S. Application Data

(63) Continuation of application No. 11/483,125, filed on Jul. 7, 2006, now Pat. No. 8,397,171.

(60) Provisional application No. 60/788,554, filed on Mar. 31, 2006, provisional application No. 60/787,541, filed on Mar. 31, 2006.

(51) Int. Cl.
*G06F 3/048* (2013.01)
*G01C 21/36* (2006.01)
*G06F 3/0354* (2013.01)
*G06F 3/0485* (2013.01)
*G09B 29/10* (2006.01)
*G06F 3/0484* (2013.01)
*G08G 1/0969* (2006.01)
*H04L 29/08* (2006.01)

(52) U.S. Cl.
CPC .......... *G06F 3/0354* (2013.01); *G01C 21/3682* (2013.01); *H04L 67/04* (2013.01); *H04L 67/36* (2013.01); *G06F 3/0485* (2013.01); *G09B 29/102* (2013.01); *G06F 3/03549* (2013.01); *G06F 3/04842* (2013.01); *G08G 1/0969* (2013.01)
USPC .......................................... 715/764; 715/767

(58) Field of Classification Search
USPC ............................ 715/764, 767, 208; 701/208
See application file for complete search history.

(56) References Cited

U.S. PATENT DOCUMENTS 5,237,408 A * 8/1993 Blum et al. .................... 348/154
5,264,933 A * 11/1993 Rosser et al. ................ 348/578

(Continued)

*Primary Examiner* — Phenuel Salomon
(74) *Attorney, Agent, or Firm* — Gowling Lafleur Henderson LLP

(57) ABSTRACT

A viewable map region of a map is visually displayed in a display, and a plurality of point of interest (POI) indicators are presented in the viewable region. One or more off-map indicators are also presented in the viewable region, where each off-map indicator indicates a POI indicator outside of the viewable region but within a predetermined range. In response to detecting a forward signal when a cursor is on a current POI or off-map indicator, the viewable region is panned in the display in the upwards direction when the cursor is on a topmost POI or off-map indicator. Otherwise, the cursor is repositioned in an upwards direction onto a next POI or off-map indicator in the viewable region. The reverse occurs with respect to detecting of a reverse positioning signal.

20 Claims, 20 Drawing Sheets

(56) References Cited

U.S. PATENT DOCUMENTS

| | | | |
|---|---|---|---|
| 5,450,140 A * | 9/1995 | Washino | 348/722 |
| 6,037,936 A * | 3/2000 | Ellenby et al. | 715/764 |
| 6,278,940 B1 * | 8/2001 | Endo | 701/533 |
| 6,288,704 B1 * | 9/2001 | Flack et al. | 345/158 |
| 6,493,630 B2 * | 12/2002 | Ruiz et al. | 701/532 |
| 6,664,989 B1 * | 12/2003 | Snyder et al. | 715/856 |
| 6,683,626 B1 * | 1/2004 | Abellera | 715/785 |
| 7,089,507 B2 * | 8/2006 | Lection et al. | 715/855 |
| 7,158,878 B2 * | 1/2007 | Rasmussen et al. | 701/431 |
| 7,260,789 B2 * | 8/2007 | Hunleth et al. | 715/858 |
| 7,631,277 B1 * | 12/2009 | Nie et al. | 715/848 |
| 7,672,922 B2 * | 3/2010 | Kaplan | 706/45 |
| 7,739,038 B2 * | 6/2010 | Coch et al. | 701/468 |
| 7,913,192 B2 * | 3/2011 | Dicke et al. | 715/864 |
| 2003/0182052 A1 * | 9/2003 | DeLorme et al. | 701/201 |
| 2004/0257340 A1 * | 12/2004 | Jawerth | 345/157 |
| 2006/0190833 A1 * | 8/2006 | SanGiovanni et al. | 715/767 |
| 2006/0242605 A1 * | 10/2006 | Kim et al. | 715/855 |
| 2009/0055774 A1 * | 2/2009 | Joachim | 715/810 |

\* cited by examiner

FIG. 1
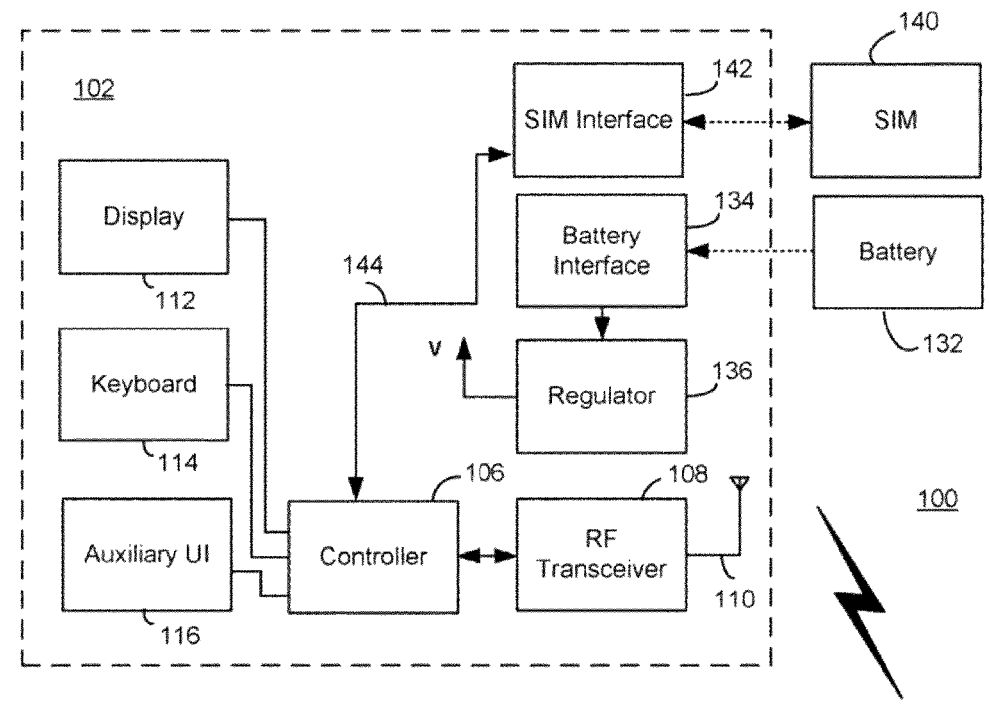
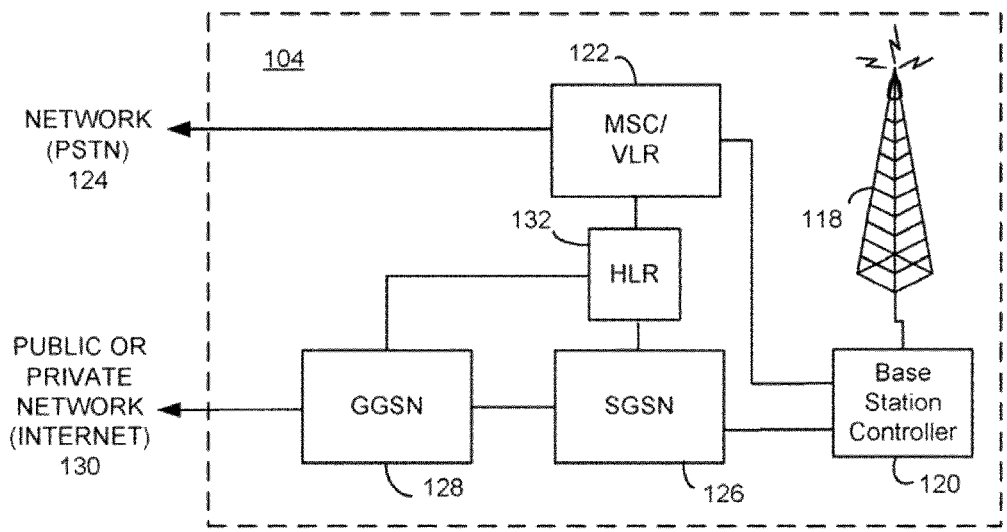

Selection Order = D, C, A, B

Selection Order = D, C, A, B, E

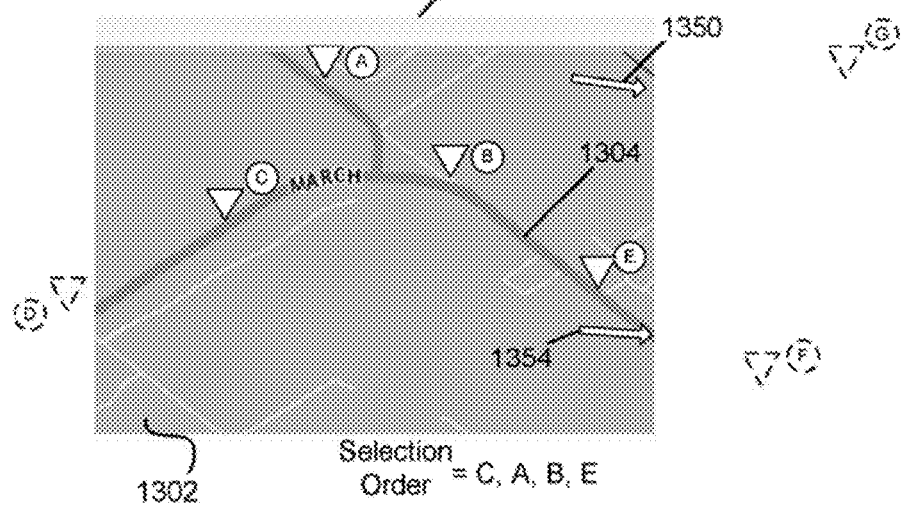
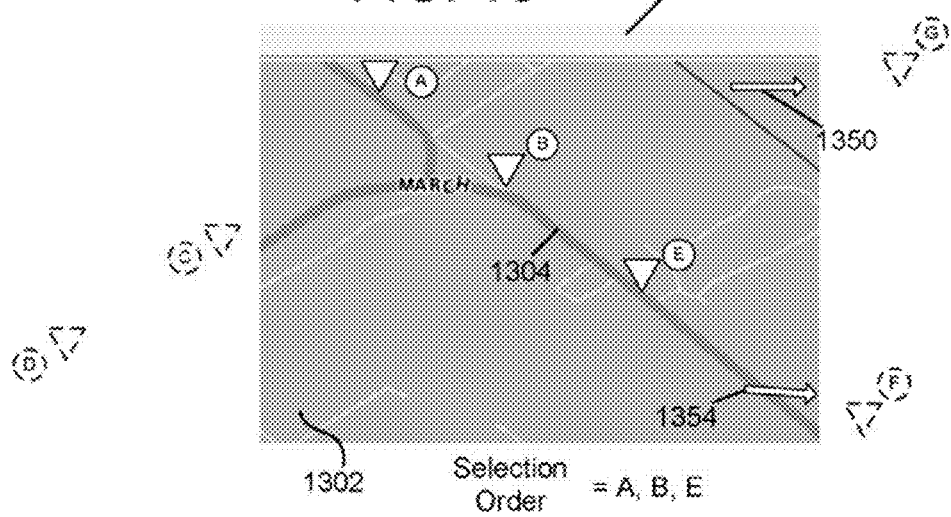

US 8,850,343 B2

USER INTERFACE METHODS AND APPARATUS FOR CONTROLLING THE VISUAL DISPLAY OF MAPS HAVING SELECTABLE MAP ELEMENTS IN MOBILE COMMUNICATION DEVICES

CROSS-REFERENCE TO RELATED APPLICATIONS

This application is a continuation of and claims priority to U.S. non-provisional patent application having application Ser. No. 11/483,125 and filing date of 7 Jul. 2006, now U.S. Pat. No. 8,397,171, which claims priority to U.S. provisional patent application having application No. 60/788,554 and filing date of 31 Mar. 2006 and to U.S. provisional patent application having application No. 60/787,541 and filing date of 31 Mar. 2006.

BACKGROUND

1. Field of the Technology

The present disclosure relates generally to user interface techniques for the control of visually displayed maps having selectable map elements (e.g. points of interest indicators and/or off-map indicators) in mobile communication devices operating in wireless communication networks.

2. Description of the Related Art

Increasingly, mobile communication devices operating in wireless communication networks are provided with mapping capabilities for presenting visually displayed maps of geographic locations. Traditionally, visually displayed maps for computer devices have been limited to those based on bitmap images which are relatively large files. In recent years, newer and even more elaborate mapping capabilities for computer devices have been devised. Mobile communication devices, which typically operate with use of one or more batteries or battery packs, however, typically have relatively limited memory and processing power as compared to larger computer devices such as personal computers (PCs) or even laptop computers.

Point Of Interest (POI) indicators on a map generally provide visual indications of locations of interest for an end user. By a "point-and-click" on such an indication via the user interface of the mobile communication device, information pertaining to that POI may be visually displayed. In that sense, such a POI indicator may be referred its to as a selectable map element.

A problem is presented, however, as to how to provide control over the user interface when many POI indicators are simultaneously displayed in the display. In this situation, the end user may wish to select one of the particular POI indicators for obtaining the POI information, but the end user may alternatively wish to pan or otherwise move the location point of the underlying map.

Accordingly, there is a need for user interface methods and apparatus for controlling the visual display of maps having selectable map elements (e.g. POI indicators and/or off-map indicators), especially in mobile communication devices which operate in wireless communication networks.

BRIEF DESCRIPTION OF THE DRAWINGS

Embodiments of present invention will now be described by way of example with reference to attached figures, wherein:

FIG. 1 is a block diagram which illustrates pertinent components of a mobile communication device and a wireless communication network of a communication system;

FIGS. 13-19 are sequential views of a plurality of viewable map regions of a map rendered in the display to illustrate an example of the method described in relation to FIGS. 11-12.

DETAILED DESCRIPTION OF THE PREFERRED EMBODIMENTS

Figure 2:
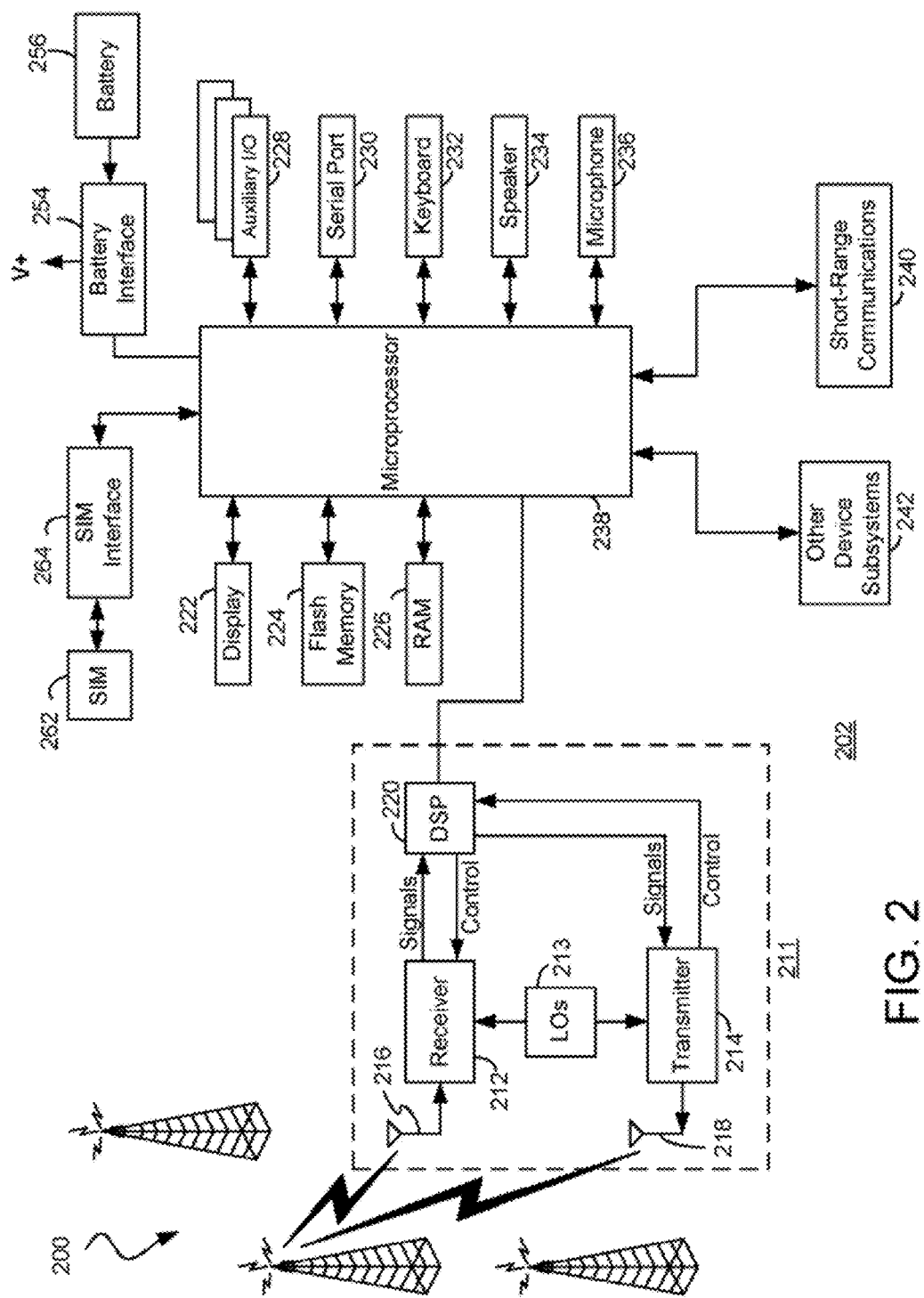
FIG. 2 is a more detailed diagram of a preferred mobile communication device of FIG. 1 namely, a mobile station.

According to the present disclosure, one illustrative method for use in controlling user interface operation of a communication device when visually displaying a map involves the steps of causing a viewable map region of the map to be visually displayed in a display, the viewable map region having a plurality of selectable map elements; maintaining a list of element identifiers which includes element identifiers corresponding to the selectable map elements in the viewable map region, each element identifier being associated with a pair of x, y coordinates for visual display; controlling end user selection of the selectable map elements via a positioning mechanism in left and right directions in accordance with a numeric order of the x-coordinates; controlling end user selection of the selectable map elements via the positioning mechanism in up and down directions in accordance with a numeric order of the y-coordinates; and repeating the acts of causing, maintaining, and controlling for a next viewable map region of the map having a next plurality of selectable map elements.

Further, the end user selection may be controlled specifically by monitoring to detect a forward direction positioning signal from the positioning mechanism; in response to detecting the forward direction positioning signal: causing a cursor in the display to be moved in a forward direction so as to select a next selectable map element in the viewable map region, but if a last selectable map element in the viewable map region is currently selected when the forward direction positioning signal is detected, causing the viewable map region of the map to be panned in the display in the forward direction; monitoring to detect a reverse direction positioning signal from the positioning mechanism; and in response to detecting the reverse direction positioning signal: causing the cursor in the display to be moved in a reverse direction opposite the forward direction so as to select a previous map element in the viewable map region, but if a first selectable map element in the viewable map region is currently selected when the reverse direction positioning signal is detected, causing the map to be panned in the display in reverse direction.

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the its mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a Global Positioning System (GPS) unit, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with Global Systems for Mobile Communications (GSM) and General Packet Radio Service (GPRS) technologies. Although wireless communication network 104 is described herein as a GSM/GPRS type network, any suitable network technologies may be utilized such as Code Division Multiple Access (CDMA), Wideband CDMA (WCDMA), whether 2G, 3G, or Universal Mobile Telecommunication System (UMTS) based technologies. In this embodiment, the GSM/GPRS wireless network 104 includes a base station controller (BSC) 120 with an associated tower station 18, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform its communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the user interface control techniques of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3A:
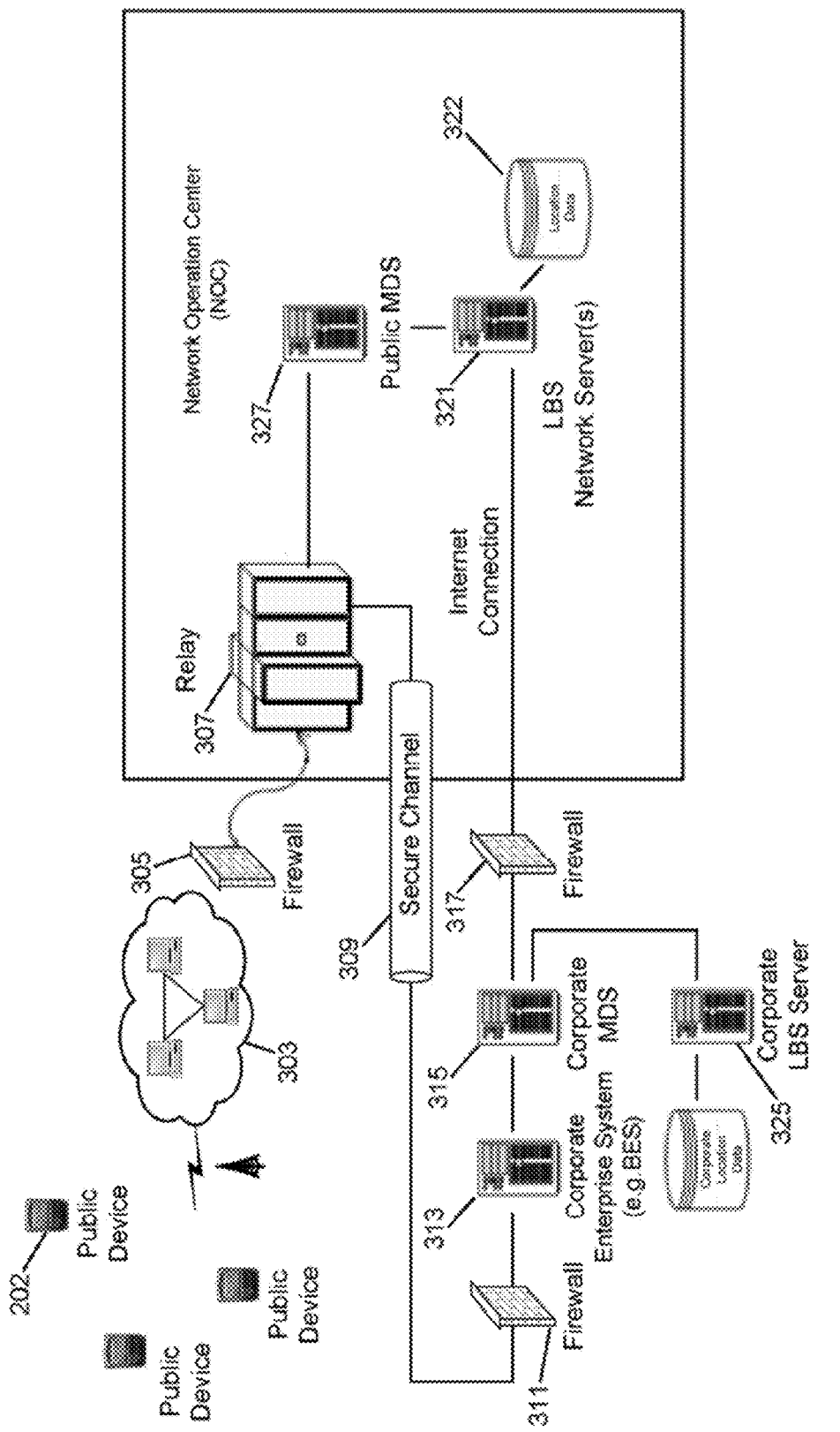
FIG. 3A is a system diagram of network components which provide mapping functionality in the mobile communication devices of FIGS. 1 and 2.

FIG. 3A is a system diagram of network components which provide mapping functionality in the mobile communication devices of FIGS. 1 and 2. To achieve this, a mapping application is also provided in memory of the mobile communication device (e.g. a mapping application 550 of FIG. 5) for rendering of visual maps in its display. Mobile communication devices, such as mobile station 202, are connected over a mobile carrier network 303, for communication through a firewall 305 to a relay 307. A request for map data from any one of the mobile communication devices is received at relay 307 and passed via a secure channel 309 through firewall 311 to a corporate enterprise server 313 and corporate mobile data system (MDS) server 315. The request is then passed via firewall 317 to a public location-based service (LBS) server 321 which provides location-based services (LBS) to handle the request. The network may include a plurality of such LBS servers where requests are distributed and processed through a load distributing server. The LBS data may be stored on this network server 321 in a network database 322, or may be stored on a separate LBS data server (not shown). Private corporate data stored on corporate LBS server 325 may be added to the public data via corporate MDS server 315 on the secure return path to mobile station 202. Alternatively, where no corporate servers provided, the request from mobile station 202 may be passed via relay 307 to a public MDS server 327, which sends the request to public LBS server 321 providing LBS to handle the request.

A Maplet data structure is provided that contains all of the graphic and labeled content associated with a geographic area (e.g. map features such as restaurants (point features), streets (line features), or lakes (polygon features)). Maplets are structured in Layers of "DEntries" (Data Entries) identified by a "layer ID" to enable data from different sources to be deployed to the device and meshed for proper rendering. Each DEntry is representative of one or more artifact or label (or a combination of both) and includes coordinate information (also referred to a "bounding box" or "bounding area") to identify the area covered by the DEntry and a plurality of data Points that together represent the artifact or label. For example, a DEntry may be used to represent a street on a city map (or a plurality of streets), wherein the various Points within the DEntry are separated into different parts representing various portions of the artifact (e.g. portions of a street). A mobile device may issue a request for the map server to download only those DEntries that are included within a specified area or bounding box representing an area of interest that can be represented by, for example, a pair of bottom left, top right coordinates.

As discussed later below with reference to FIG. 3B, the mobile device issues one or more AOI (Area of Interest) requests, DEntry or data requests and Maplet Index requests to the map server, for selective downloading of map data based on user context Thus, rather than transmitting the entire map data with each request from the device, local caching may be used within the mobile device in conjunction with context filtering of map data on the server. For example, if a user's mobile device is GPS enabled and the user is traveling in an automobile at 120 km/hr along a freeway then context filtering can be employed to prevent downloading of map data relating to passing side streets. Or, if the user is traveling in an airplane at 30,000' then context filtering can be employed to prevent downloading of map data for any streets whatsoever. Also, a user's context can be defined, for example, in terms of occupation (e.g. a user whose occupation is transport truck driver can employ context filtering to prevent downloading of map data for side streets on which the user's truck is incapable of traveling, or a user whose occupation is to replenish supplies of soft drink dispensing machines can employ context filtering to download public map data showing the user's geographical area of responsibility with irrelevant features such as lakes or parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data Points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, as discussed above, if the size attribute or complexity attribute of an artifact that has started to move into the field of view of the device (but is not yet being displayed) is not relevant to the viewer's current context, then the device can choose its not to display that portion of the artifact. On the other hand, if the portion of the artifact is appropriate for display then the device accesses its cache to determine whether the DEntries associated with that portion of the artifact have already been downloaded, in which case the cached content is displayed. Otherwise, the device issues a request for the map server to download all of the DEntries associated with the artifact portion.

By organizing the Maplet data structure in Layers, it is possible to seamlessly combine and display information obtained from public and private databases. For example, it is possible for the device to display an office building at a certain address on a street (e.g. $1^{st}$ z-order attribute from public database), adjacent a river (e.g. $2^{nd}$ z-order attribute from public database), with a superimposed floor plan of the building to show individual offices (e.g. $11^{th}$ z-order attribute from a private database, accessible through a firewall).

Referring back to FIG. 3A, within the network having LBS server(s) 321 and database(s) 322 accessible to it, all of the map data for the entire world is divided and stored as a grid according to various levels of resolution (zoom), as set forth below in Table A. Thus, a single A level Maplet represents a 0.05×0.05 degree grid area; a single B level Maplet represents a 0.5×0.5 degree grid area; a single C level Maplet represents a 5×5 degree grid area; a single D level Maplet represents a 50×50 degree grid area and a single E level Maplet represents the entire world in a single Maplet. It is understood that Table A is only an example of a particular Maplet grid configuration; other or different grid configurations may also be developed, A Maplet comprises of a set of layers, with each layer containing a set of DEntries, and each DEentry containing a set of points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

Figure 3B:
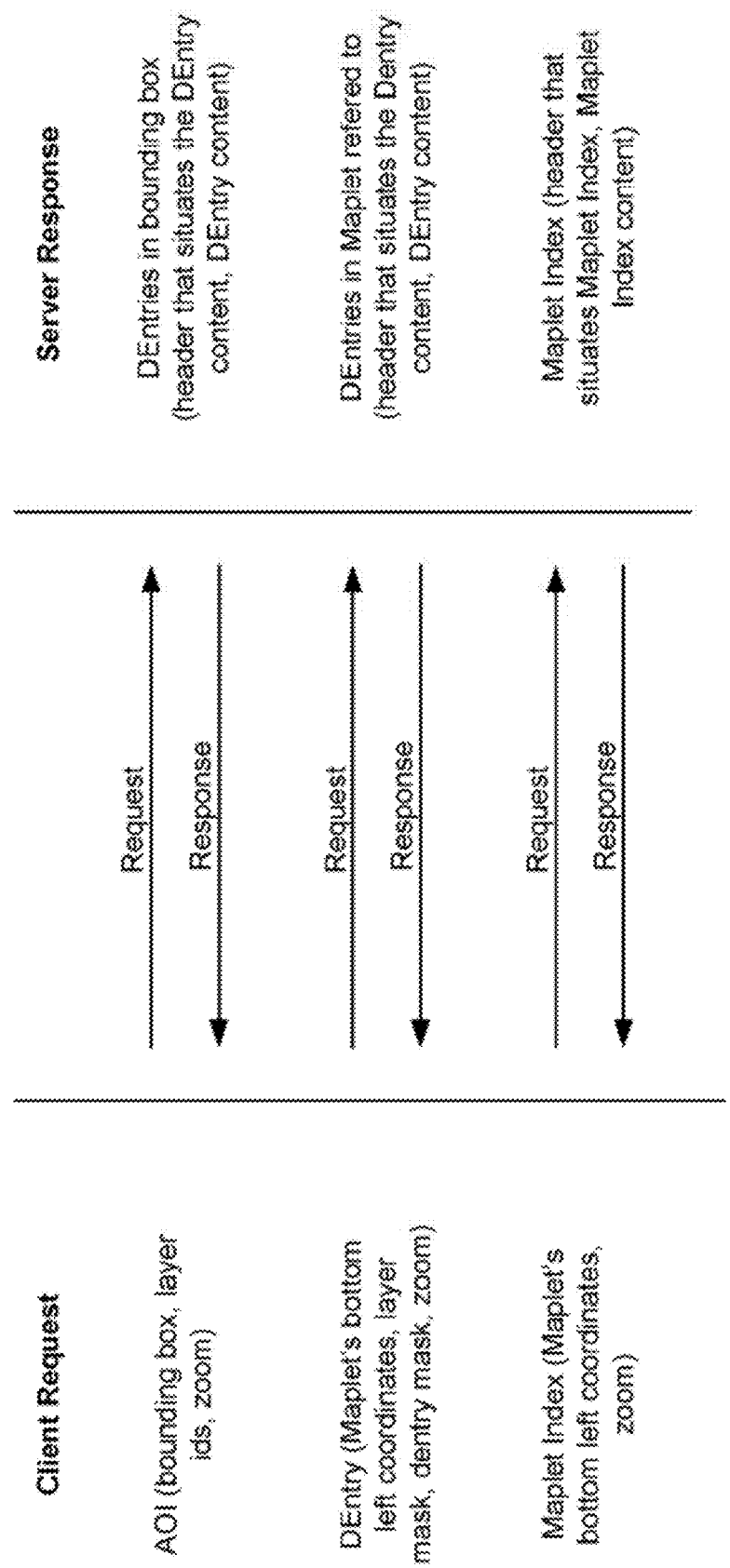
FIG. 3B illustrates a message exchange between a mobile communication device and a map server for downloading map content to the mobile communication device based on the system of FIG. 3A.

Turning now to FIG. 3B, three specific types of requests may be generated by a mobile communication device (i.e. the client)—AOI requests, DEntry requests, and Maplet Index requests. The requests may be generated separately or in various combinations, as discussed in greater detail below. An AOI (area of interest) request calls for all DEntries in a given area (bounding box) for a predetermined or selected set of z-order layers. The AOI request is usually generated when the mobile communication device moves to a new area so as to fetch Dentries for display before the device client knows what is available in the Maplet. The Maplet Index has the exact same structure as a Maplet but does not contain complete DEntries (i.e. the data Points that actually represent artifacts and labels are omitted). Thus, a Maplet Index defines what layers and DEntries are available for a given Maplet. A data or DEntry request is a mechanism to bundle together all of the required DEntries for a given Maplet.

Typically, AOI and Maplet Index requests are paired together in the same message, although they need not be, while DEntry requests are generated most often. For example, when the mobile communication device moves into an area in connection with which no information has been stored on the device client, the Maplet Index request returns a Maplet Index that indicates what data the client can specifically request from the server 321, while the AOI request returns any DEntries within the area of interest for the specified layers (if they exist). In the example requests shown in FIG. 33, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

According to the present disclosure herein, a collection of 20×20 A-level Maplets (representing a 1×1 degree square) is compiled into a Maplet file (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
| --- | --- | --- |
| 0x000 | Maplet # 0 Offset (4 bytes) | Maplet # 0 Length (4 bytes) |
| 0x008 | Maplet # 1 Offset | Maplet # 1 Length |
| 0x010 | Maplet # 2 Offset | Maplet # 2 Length |
| ... | ... | ... |
| 0xC78 | Maplet # 399 Offset | Maplet # 399 Length |
| 0xC80 | | Beginning of Maplet # 0 |
| 0xC80 + Size of Maplet # 0 | | Beginning of Maplet # 1 |
| 0xC80 + Size of Maplet # 0 + # 1 | | Beginning of Maplet # 2 |
| ... | | ... |
| 0xC80 + Σ of Size of Maplets (# 0: # 398) | | Beginning of Maplet # 399 |

In Table B, the offset of Maplet #0 is 0x0000_0000 since, according to the present disclosure, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as Maplet # (n+1) Offset=Maplet # (n) Offset+Maplet #(n) Length. If a Maplet has no data or does not exist, the length parameter is set to zero (0x0000_0000).

TABLE C

| Address Offset | Offset (4 bytes) | Length (4 bytes) |
| --- | --- | --- |
| 0x000 | Maplet Index # 0 Offset | Maplet Index # 0 Length |
| 0x008 | Maplet Index # 1 Offset | Maplet Index # 1 Length |
| 0x010 | Maplet Index # 2 Offset | Maplet Index # 2 Length |
| ... | ... | ... |
| 0xC78 | Maplet Index # 399 Offset | Maplet Index # 399 Length |
| 0xC80 | | Beginning of Maplet Index # 0 |
| 0xC80 + Size of Maplet Index # 0 | | Beginning of Maplet Index # 1 |
| 0xC80 + Size of Maplet Index # 0 + # 1 | | Beginning of Maplet Index # 2 |
| ... | | ... |
| 0xC80 + Σ of Size of Maplet Indices (# 0: # 399) | | Beginning of Maplet Index # 399 |

In Table C, the offset of Maplet index #0 is 0x0000_0000 since, according to the present disclosure the data structure is based on the assumption that the base address for the actual Maplet index data is 0x0000_0C80. Therefore the absolute address for Maplet Index #0 data is: Maplet Index #0 Address=Base Address (0x0000_0C80)+Maplet Index #0 Offset (0x0000_0000), and additional Maplet index addresses are calculated as: Maplet Index # (n+1) Offset=Maplet Index # (n) Offset+Maplet Index #(n) Length. If a Maplet Index has no data or does not exist, the length parameter is set to zero (0x0000_0000).

Figure 3C:
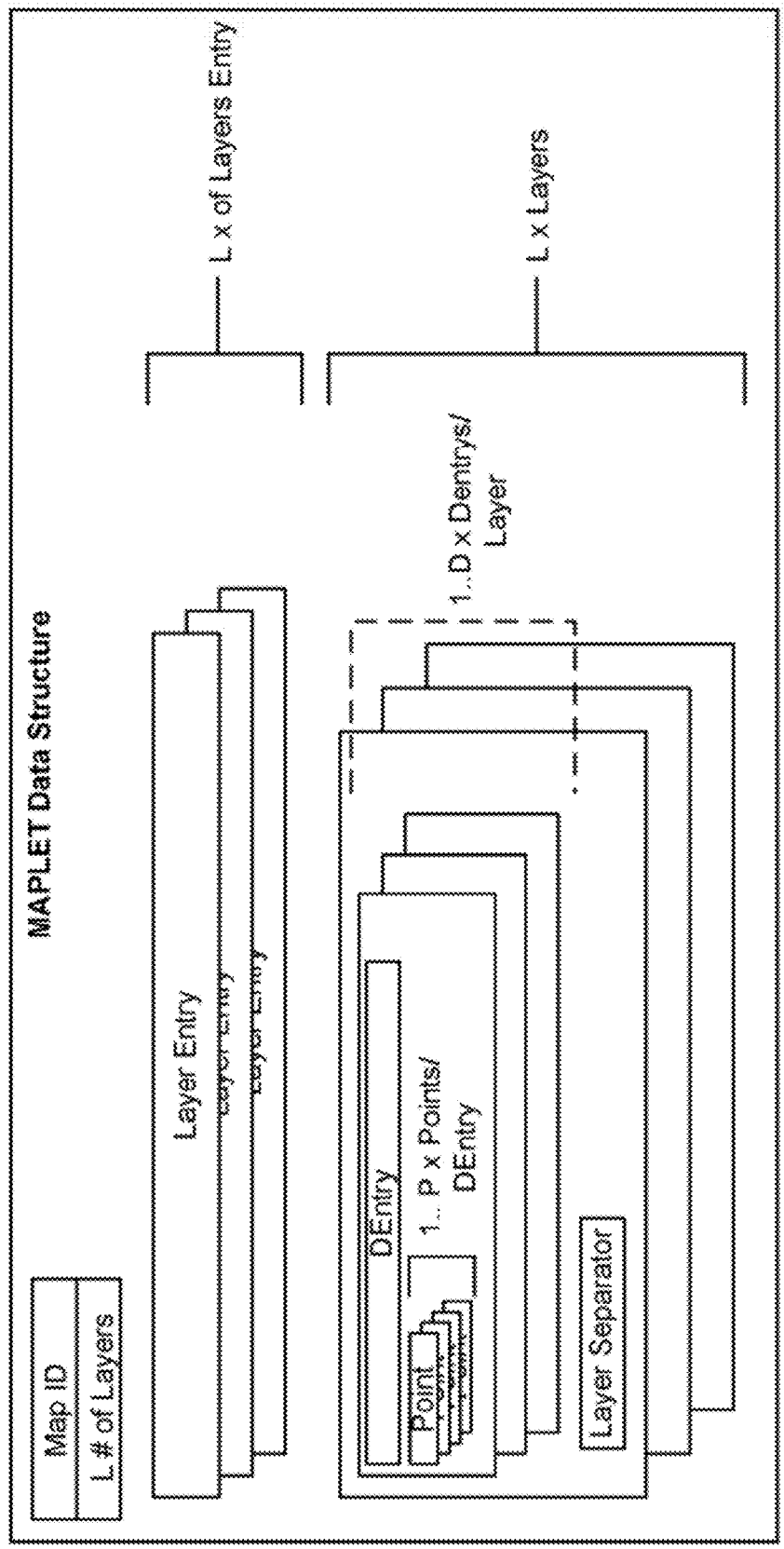
FIG. 3C is a diagram showing a Maplet data structure according its to an exemplary embodiment.

FIG. 3C and Table D below, in combination, illustrate an exemplary embodiment of a basic Maplet data structure. Generally, as noted above, the Maplet data structure can be said to include a Maplet Index (i.e. an index of the DEntries, each of which representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes for all DEntries in the corresponding Layer and is followed by a list of DEntries for that Layer. The above forms a Maplet Index. For a complete Maplet, each DEntry contains a set of data Points (referred to herein as ° Points) or Labels). Note that Layers may have multiple DEntries and the complete list of DEntrys and Points are grouped by Layer and separated by a Layer Separator (e.g. hex value 0xEEEEEEEE). According to an exemplary embodiment, each Layer Entry is 20 bytes long, and a DEntry is 12 bytes long. However, the number of Layers, number of DEntries per Layer and the number of Points per DEntry depends on the map data and is variable.

Table D provides a high "byte-level" description of a Maplet.

TABLE D

| Data | Quantity | Total # of Bytes |
| --- | --- | --- |
| Map ID | 1 | 4 bytes |
| # of Layers | 1 | 4 bytes |
| Layer Entrys | # of Layers | 20 bytes × (# of Layers) |
| DEntry of a Layer | x (# of DEntries in a Layer) | # of Layers | 12 bytes × (Σ of the # of DEntrys in each Layer) + |
| Points for DEntry of a Layer | | | 4 bytes × (Σ of the # of Points in each DEntry in each Layer) + |
| Layer Separator | | 4 bytes × (# of Layers) |

For even greater detail if desired, this application hereby incorporates by reference herein a U.S. provisional patent application entitled "Method And System For Distribution Of Map Content To Mobile Communication Devices" having Ser. No. 60/787,541, (also RIM 30176-ID), lead inventor Eric Johnson, and a filing date of 31 Mar. 2006.

Figure 4:
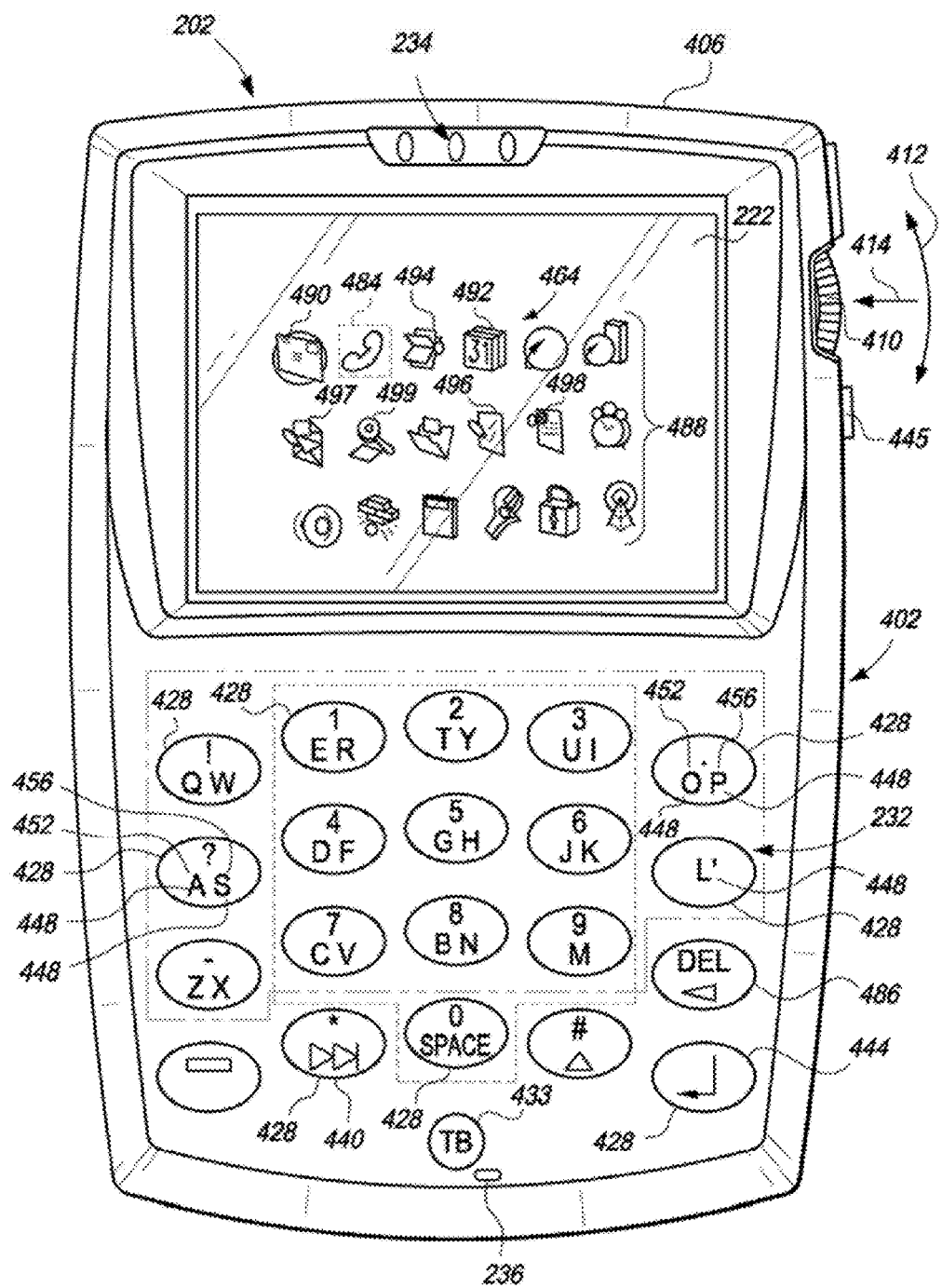
FIG. 4 is an illustration of a user interface of the mobile communication device.

FIG. 4 is an example of a user interface 402 of mobile station 202 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. As employed herein, the term "cursor" shall expressly include, but not be limited by, a pointer, a movable item or other visual cue (e.g., without limitation, a graphical object; a special symbol; an outline; a rectangle; an underline character; a blinking item) used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. It is understood that the expression "characters" shall broadly be construed to include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, whether presently known or unknown, and either reduced or not reduced (i.e. its full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Positioning wheel 410 will be described in more detail in relation to FIGS. 6 and 7 below.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
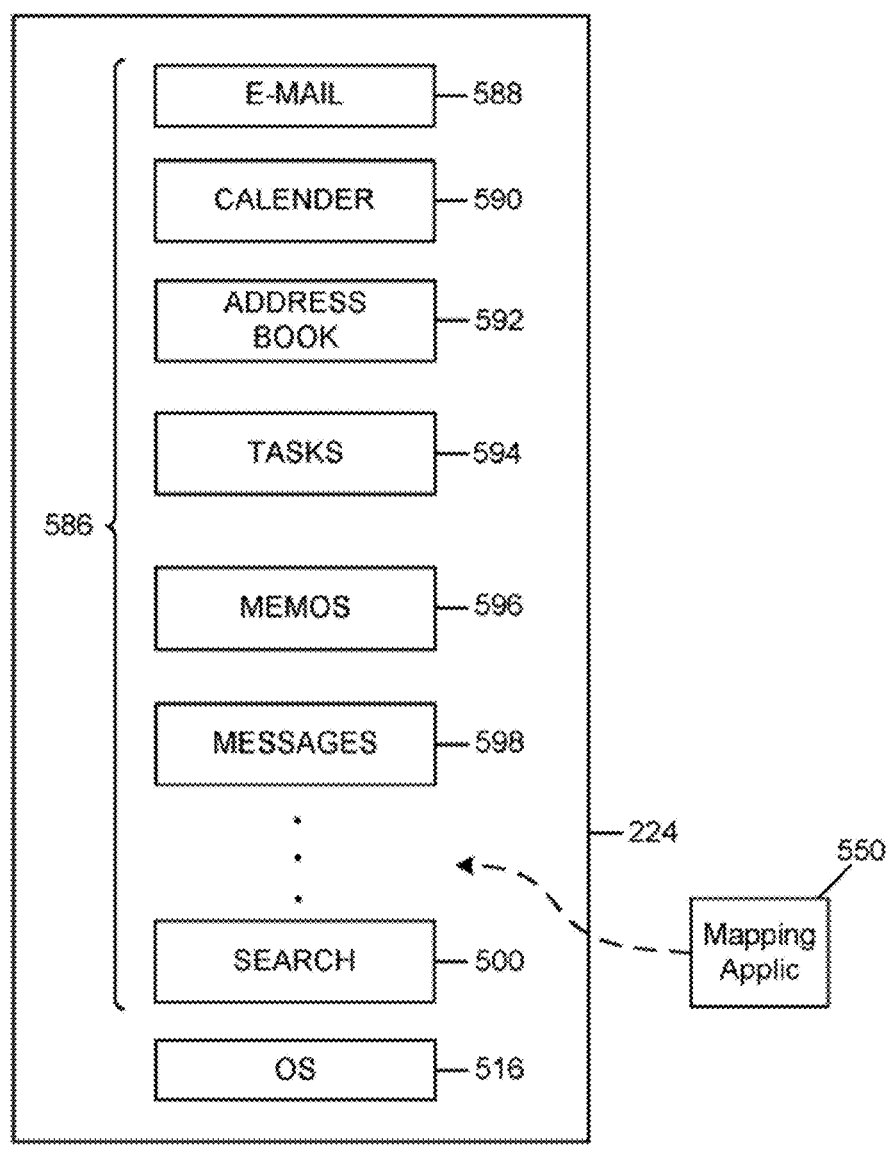
FIG. 5 is an illustration of various software applications which may reside in the mobile communication device.

As shown in FIG. 5, memory 224 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Messages application 598 (FIG. 5) associated with Message icon 497 (FIG. 4), and a Search application 500 (FIG. 5) associated with Search icon 499 (FIG. 4). An operating system (OS) program 516 also resides in memory 224. The mobile station of the present disclosure is also adapted to render visual maps in its visual display, and utilizes a mapping application 550 stored in memory 224 to facilitate map rendering and related functionality.

In FIG. 4, the "home" screen output is currently active and constitutes the main "ribbon" application for displaying the icons 488 shown. An application, such as Email application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499, Applications 585 may be additionally or alternatively initiated (opened or viewed) from user interface 402 by providing another suitable input to it, such as by suitably rotating or "rolling" trackball 433 and providing a selection input by, for example, pushing the trackball 33 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222, and since information and messages are typically only partially presented in the limited view of display 222 at any given moment. As previously described, positioning wheel 410 is one helpful cursor/view positioning mechanism to achieve such movement. Positioning wheel 312, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward its housing 406 (e.g. with the end user's index finger or thumb) for selection of information. Again, see the direction indicated by an arrow 414 of positioning wheel 410 shown.

Figure 6:
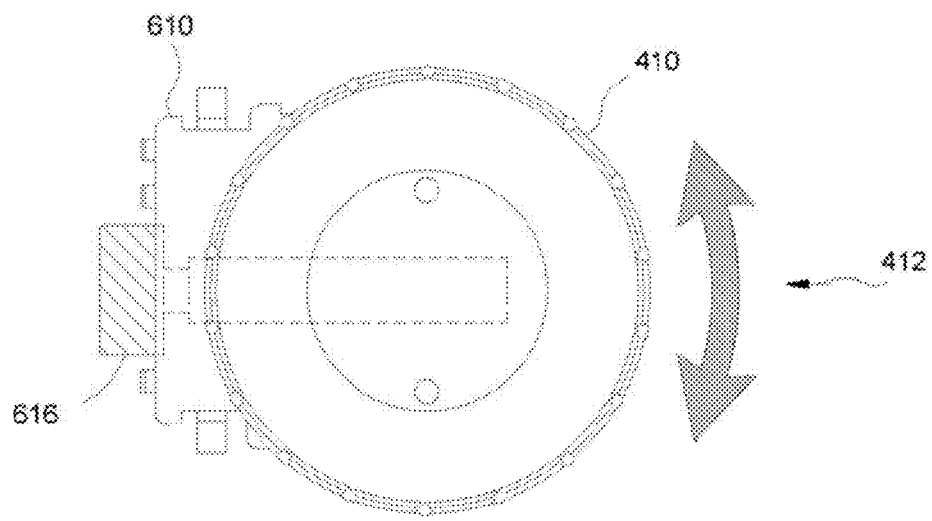
FIGS. 6 and 7 are illustrations of a positioning wheel of the mobile communication device.
Figure 7:
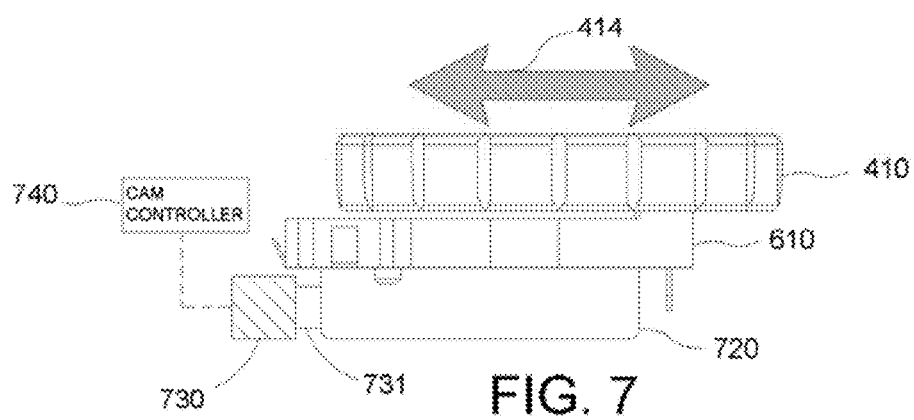

A more detailed mechanism for positioning wheel 410 is now described in relation to FIGS. 6 and 7. Positioning wheel 410 of FIGS. 6-7 is shown connected to and rotatable about a body assembly 610. Body assembly 610 may be connected to or be part of a slide assembly 720. Slide assembly 720 allows the entirety of positioning wheel 410 and body assembly 610 may move freely laterally 414 with respect to the handheld device. Lateral positioning wheel movement 414 is defined as movement along a plane normal to the rotational axis of positioning wheel 410. To control this lateral movement 414, slide assembly 720 may be connected to a control mechanism such as a cam mechanism 730 with a cam 731, or alternatively a level mechanism, a solenoid mechanism, or some other actuating means. Cam mechanism 730 is connected to a cam controller 740 responsible for controlling a lateral position of positioning wheel 410. As cam 731 connected to cam mechanism 730 and slide assembly 720 moves, positioning wheel 410 and body assembly 610 accordingly move laterally. Such lateral movement inwards toward the housing is detectable by the processor of the mobile station as a switch input (actuation or depression of the positioning wheel key).

Although positioning wheel 410 has been shown and described as one mechanism for use in navigating and moving through visually displayed information, any suitable mechanism may be utilized for the present user interface techniques, such a trackball; UP, DOWN, LEFT, and RIGHT keys; a mouse and cursor mechanism; or a touch screen display mechanism.

Figure 8:
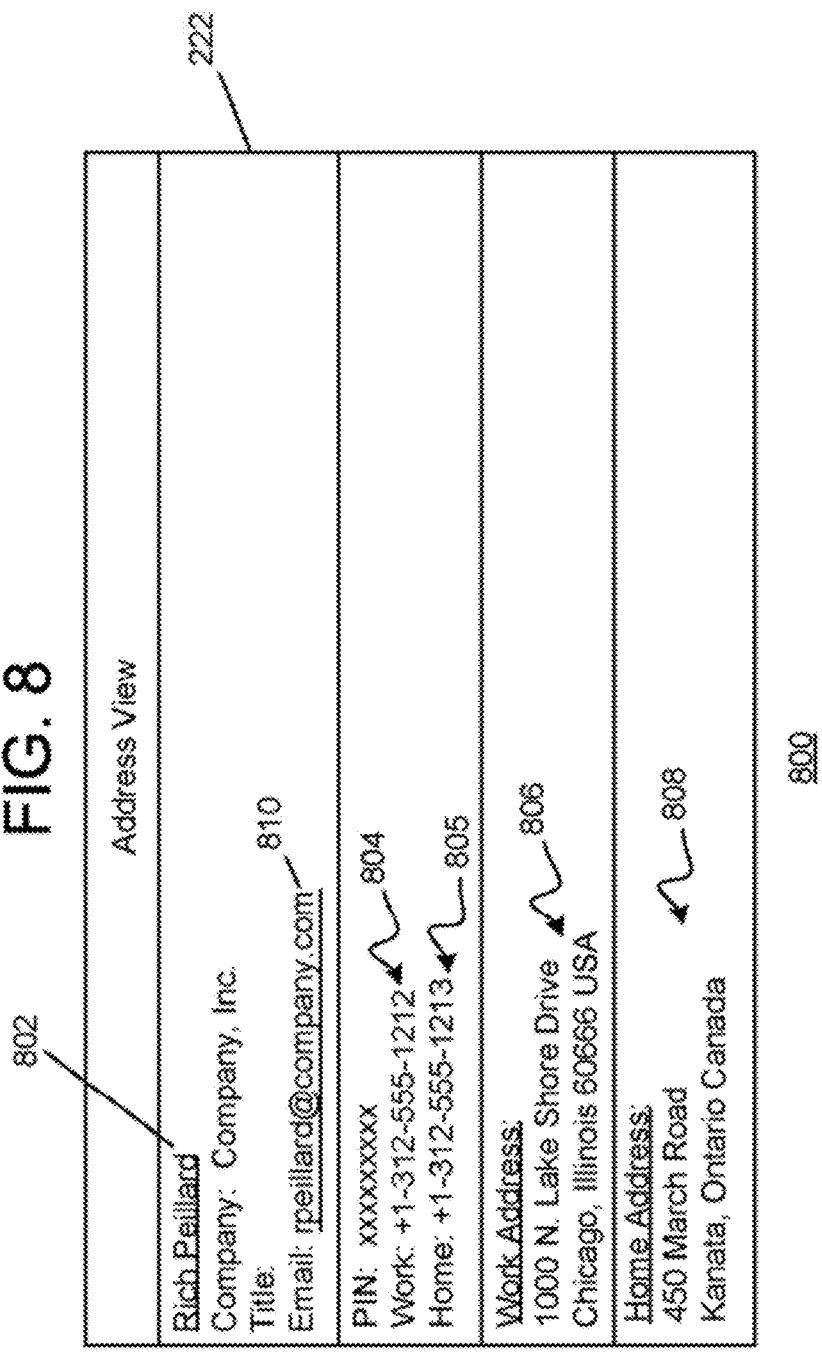
FIG. 8 is an illustration of information which may be displayed in a visual display of the mobile communication device, the information being an address book contact of an address book of the mobile communication device.

FIG. 8 is an illustration of information which may be displayed in the display 222. In this embodiment, the information displayed in FIG. 8 is an address book contact 800 of an address book which may be displayed in display 222 from use of Address book application 592 (FIG. 5). The address book is for use in organizing a plurality of address book contacts for the end user. This address book contact information 800 may be viewable after opening the Address Book application from the home screen page. In the example of FIG. 8, address book contact information 800 includes an address book name 802 in an address book name field, a business or work telephone number 804 in a business or work telephone number field, a home telephone number 805 in a home telephone number field, a business or work address 806 in one or more business or work address fields, and a home address 808 in one or more home address fields. Other information may include a company name (e.g. Company, Inc.) in a company name field, a title or position of the end user in the company, and a Personal Identification. Number (PIN) in a PIN field. Each address book contact of the address book has a plurality of the same fields for organizing such information. Some field of any address book contact may remain empty, depending on the end user and/or the availability of information to the end user. The end user typically manually enters address book contact information for each contact into storage of memory for subsequent use in facilitating communications. Alternatively or additionally, address book contact information may be downloaded or otherwise received in the device in a non-manual fashion. Additional location information for the address book contact information 800 may be included, such as a real-time location of a mobile communication device associated with the selected address book contact received through the wireless transceiver. This location may be in the form of a real-time position address or real-time latitude and longitude coordinates, and may be received substantially in real-time by the mobile communication device.

In addition to providing one or more user applications for the end user as previously described, the mobile station of the present disclosure is also adapted to render visual maps in its display 222. Referring back to FIG. 5, mapping application 550 is provided in memory 224 of the mobile station for rendering of visual maps in the display. Map rendering may be performed substantially as described in relation to FIG. 3 where the mobile station sends requests for map rendering data to the network with address and/or latitude and longitude coordinates as input, subsequently receiving the map rendering data which it uses to render a map in the visual display. Map rendering data may be cached and maintained in memory over time. Alternatively, map rendering may be performed by retrieving "bitmaps" of the maps and visually displaying these bitmaps corresponding to the address and/or latitude and longitude coordinates.

Figure 9:
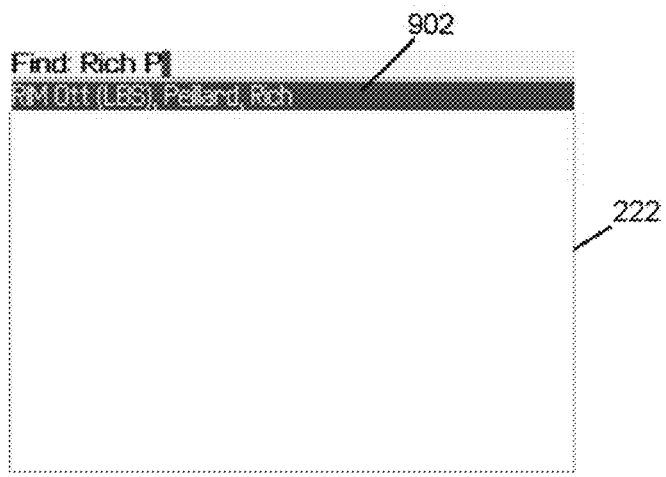
FIG. 9 is an illustration of a listing of the address book contact of FIG. 8.
Figure 10:
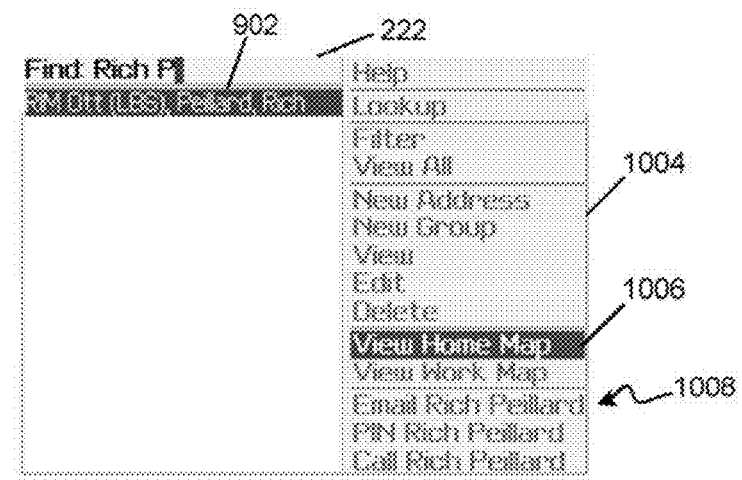
FIG. 10 is an illustration of the listing of the address book contact of FIG. 9, where a menu of functions which includes a map function may be invoked to display a map associated with the address book contact, the map being generally shown later in FIGS. 13-19.

As an example of one way in which the displaying of a map may be initiated, FIG. 9 is an illustration of a listing 902 of the address book contact of FIG. 8. In FIG. 10, it is shown that a pop-up or pull-down menu 1004 with a plurality of function identifiers 1008 may be displayed in association with the listing 902 of the address book contact. The plurality of function identifiers 1008 includes a map function identifier 1006 (e.g. "View Home Map") which may be selected by the end user to cause the map application to be called so that a map associated with the address book contact to be displayed. The map(s) associated with this address book contact are shown and described later in relation to FIGS. 13-19.

Note that the positioning mechanism (e.g. the positioning wheel of FIGS. 4, 6, and 7) of the mobile station may be used by the end user to select this map function identifier 1006, as well as any other function identifier 1008, from menu 1004 in FIG. 9. Specifically, the listing 902 of the address book contact is selected by the end user by depressing or actuating the positioning wheel while the listing 902 is highlighted in FIG. 9, which causes menu 1004 to appear in display 222 as shown in FIG. 10. Subsequently, a cursor may be scrolled up and/or down through function identifiers 1008 of menu 1004 by the end user by rotating the positioning wheel in an upwards and/or downwards direction. By rotating the positioning wheel, the cursor may be positioned over map function identifier 1006 ("View Home Map"), which causes the function identifier to be highlighted as shown in FIG. 10. While map function identifier 1006 is highlighted, map function identifier 1006 is invoked by the end user by depressing or actuating the positioning wheel. Thus, the positioning wheel may be used to scroll, navigate, and select functions in the mobile station as described. More generally, the positioning wheel may be used to scroll, navigate, and select through files, messages, and other information stored in the mobile station.

Figure 11:
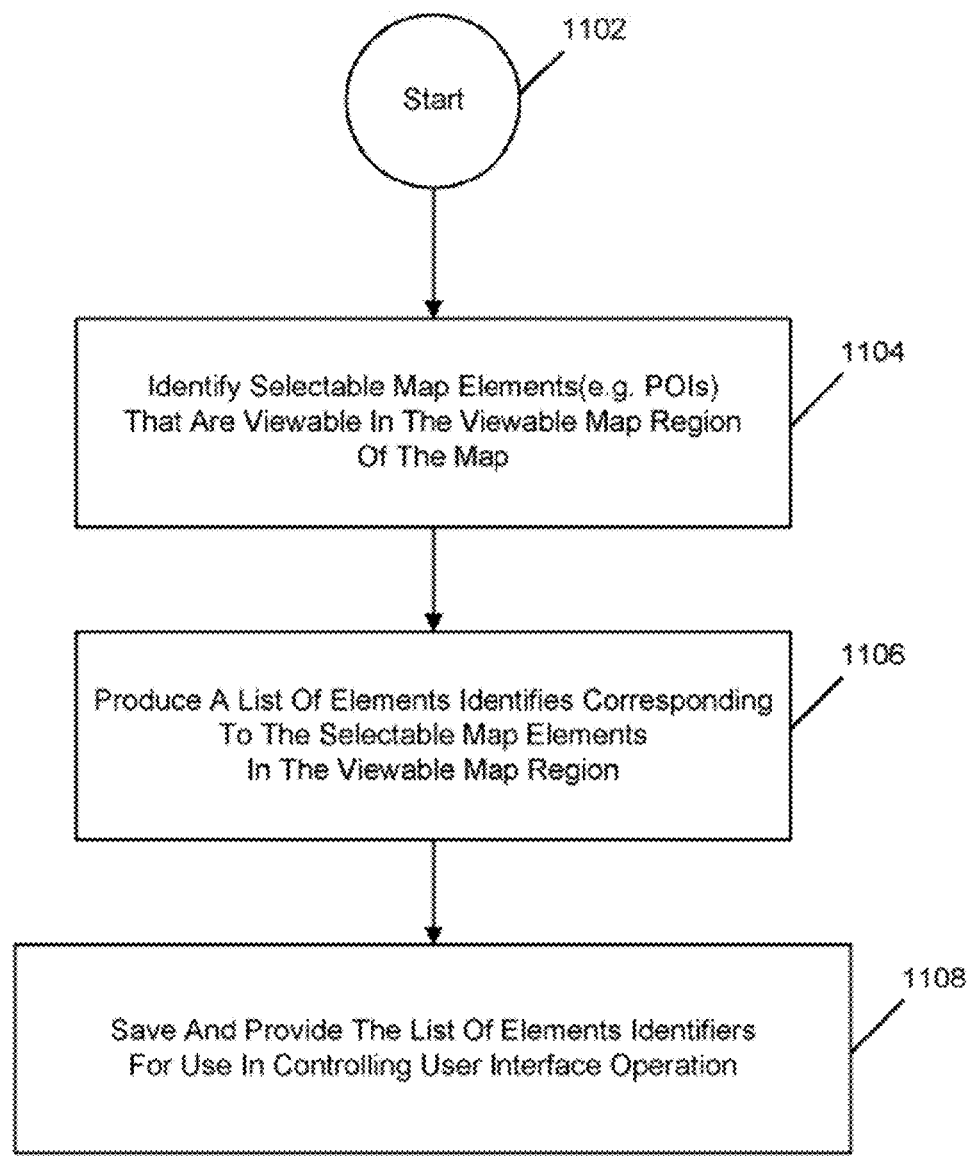
FIGS. 11-12 are flowcharts which help describe a method of controlling the visual display of maps according to the present disclosure.
Figure 12:
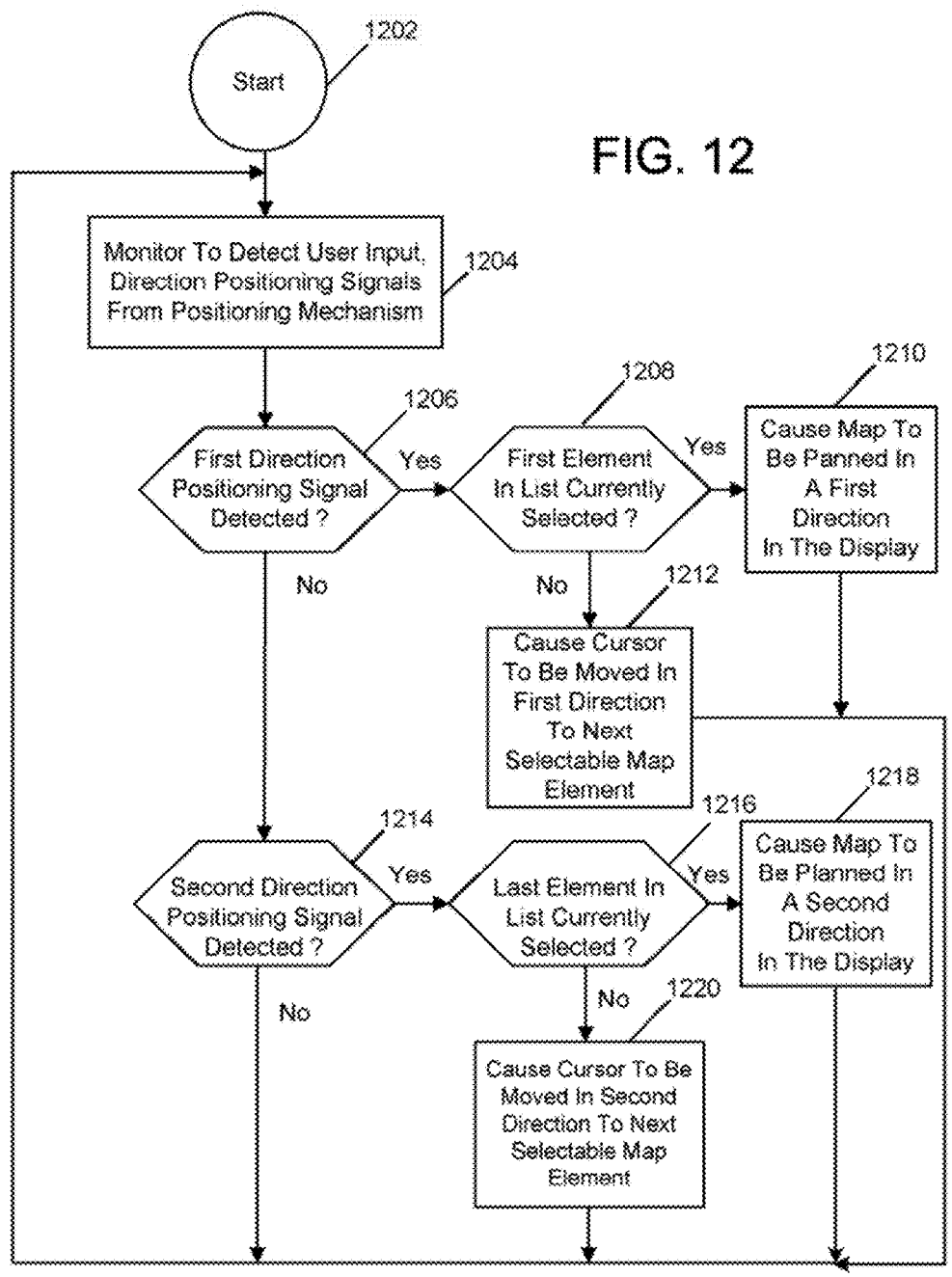

FIGS. 11-12 are flowcharts which help describe a method of controlling the visual display of maps according to the present disclosure. The method is performed by a mobile communication device as described in relation to the previous figures, or alternatively by any computer or communication device (e.g. a PC). The method may be executed by one or more processors of the communication device. A computer program product for the mobile station may include computer instructions stored on a computer readable medium (memory, a floppy disk or CD-ROM) which are written in accordance with the described logic of this method.

To begin discussion of the method of FIGS. 11-12, the processor of the communication device causes a viewable map region of a map to be displayed in its display (step 1104 of FIG. 11). The viewable map region of the map may be rendered in response to a number of different trigger signals, such as by a user input signal (e.g. the technique described earlier in relation to FIGS. 8-10) or a communication signal (e.g. update for real-time current map location of the mobile communication device). The display reveals a plurality of selectable map elements that have been provided for and viewable within the viewable map region of the map. The selectable map elements may be selectable points of interest (POI) indicators which correspond to points of interest for the end user. The map elements are "selectable" in the sense that they are selectable by the end user with use of the user interface while the viewable map region is displayed.

To provide the selectable map elements in the viewable map region, the processor maintains a list of element identifiers in memory which includes element identifiers associated with the selectable map elements (step 1106 of FIG. 11). The list may or may not include additional map elements which are not viewable within the viewable map region (e.g. map elements within a predetermined range of location but not yet within view, or off-map indicators). The element identifiers in the list have or are associated with a designated order of selection for the selectable map elements that is based on an order of its presentation of the selectable map elements in the viewable map region. For example, the designated order may be based on an order of presentation of the selectable map elements in sequence from top to bottom, or left to right. Specifically, each element identifier is associated with a stored pair of coordinates for visual display. The pair of coordinates may be x, y screen coordinates, or latitude and longitude coordinates, or derived therefrom. It is these coordinates from which the selectable map elements are positioned within the viewable map region of the map.

The processor utilizes the list and designation order so that it is provided for use in controlling user interface operation (step 1108 of FIG. 11). The user interface operation may be the operation as described below in relation to FIG. 12. In general, user interface operation may entail controlling end user selection of the selectable map elements via a positioning mechanism in left and right directions in accordance with a numeric order of the x-coordinates of the element identifiers, and controlling end user selection of the selectable map elements via the positioning mechanism in up and down directions in accordance with a numeric order of the y-coordinates of the element identifiers.

The technique of FIG. 11 is repeated for each new viewable map region of the map which is displayed. In a typical scenario, the view of the map changes or is updated in response to a panning function (e.g. up, down, left, right, or diagonal), a zooming function (in or out), or a tracking function being performed, such that a new or updated viewable map region is regularly or repeatedly provided.

Now with respect to FIG. 12, the user interface operation is described. In general, the order of selectability of the selectable map elements that are viewable in the display is dictated by the selection order of the element identifiers in the current list produced in FIG. 11. Beginning at a start block 1202, the processor monitors to detect direction positioning signals from the positioning mechanism of the user interface (step 1204 of FIG. 12). If the processor detects a forward direction positioning signal (e.g. the positioning wheel being rotated downwards) (step 1206 of FIG. 12), then the processor identifies whether a last selectable map element in the viewable map region corresponding to an element identifier in the list having the highest coordinate value is currently selected (step 1208 of FIG. 12). If not, then the processor causes a cursor in the display to be moved in a forward direction so as to select and highlight a next selectable map element in the viewable map region (step 1212 of FIG. 12). This next map element that is selected and highlighted corresponds to the element identifier having the next higher coordinate value relative to the coordinate value of the current element identifier. When the positioning mechanism is depressed or actuated while a map element is highlighted, information (e.g. details regarding the POI) corresponding to the currently highlighted map element will be displayed in the display. The information may include a selectable icon corresponding to a file associated with the POI, or a selectable hypertext link to view a webpage for additional information pertaining to the POI. If the last selectable map element is currently selected as identified in step 1208, then the processor causes the viewable map region of the map to be panned in the display in the forward direction (step 1210 of FIG. 12). Panning in the forward direction is continued for continued/continuous detection of the forward positioning signal.

If the processor detects a reverse direction positioning signal from the positioning mechanism (e.g. the positioning wheel being rotated upwards) (step 1214 of FIG. 12), then the processor identifies whether a first selectable map element in the viewable map region corresponding to an element identifier in the list having the lowest coordinate value is currently selected (step 1216 of FIG. 12). If not, then the processor causes the cursor in the display to be moved in a reverse direction opposite the forward direction so as to select and highlight a previous map element in the viewable map region (step 1220 of FIG. 12). This previous map element that is selected and highlighted corresponds to the element identifier having the next lower coordinate value relative to the coordinate value of the current element identifier. When the positioning mechanism is depressed or actuated while a map element is highlighted, information (e.g. details regarding the POI) corresponding to the currently highlighted map element will be displayed in the display. Again, the information may include a selectable icon corresponding to a file associated with the POI, or a selectable hypertext link to view a webpage for additional information pertaining to the POI, as examples. If the first selectable map element is currently selected as identified in step 1216, then the processor causes the map to be panned in the display in reverse direction (step 1218 of FIG. 12). Panning in the reverse direction is continued for continued/continuous detection of the reverse positioning signal. The processor repeatedly continues to monitor for new direction positioning signals through the user interface.

Note that by "forward" and "reverse" directions, it is meant that movement may be provided to the right (forward) and to the left (reverse), respectively, or, alternatively, downwards (forward) and upwards (reverse), respectively, as examples. If additional degrees of freedom are provided, for example using a trackball, then a variety of other directions may be provided. Preferably, the directional movement (e.g. the direction of panning) provided by the positioning mechanism may be set and changed during user interface operation, and the order of selection of the selectable map elements will change accordingly. For example, the positioning mechanism may be set to provide panning movement to the right (e.g. scroll downwards) and to the left (e.g. scroll upwards), and this provides an order of selection for the selectable map elements from left to right (e.g. scroll downwards) and from right to left (e.g. scroll upwards). On the other hand, the positioning mechanism may be alternatively set to provide panning movement downwards (e.g. scroll downwards) and upwards (e.g. scroll upwards), and this provides an order of selection for the selectable map elements from top to bottom (e.g. scroll downwards) and bottom to top (e.g. scroll upwards). When the directional movement provided by the positioning mechanism is set and changed, the designated order of selection of the selectable map elements in the list is changed accordingly. The positioning mechanism may be set and changed in this way by an end user selection of a function from a pull-down menu provided in the display, or by an end user actuation of a key while the positioning mechanism is being utilized, as examples. Thus, the designated order of selection for elements in the list is dynamically changed in accordance with the user interface preferences.

Again, the order of selection may be determined based on at least one of the pairs of x, y coordinates associated with the selectable elements in the viewable map region. The coordinates may be latitude its and longitude coordinates of the selectable map element and/or the screen coordinates of the selectable map element, or derived therefrom. For example, x-coordinate positions of the selectable map elements may be utilized for selection order when panning along the x axis (e.g. left to right, right to left), and y-coordinate positions of the selectable map elements may be utilized for selection order when panning along the y-axis (e.g. up and down, down and up).

FIGS. 13-19 are sequential views of a plurality of viewable map regions 1302 of a map rendered in display 222 to illustrate an example of the method described in relation to FIGS. 11-12. The viewable map region 1302 may be rendered in response to a number of different trigger signals, such as by a user input signal (e.g. the technique described earlier in relation to FIGS. 8-10) or a communication signal (e.g. update for real-time current map location of the mobile communication device). In each one of these FIGS. 13-19, a different viewable map region 1302 of the map is shown. In general, the map of FIGS. 13-19 is slowly being panned from left to right to create the different viewable map regions 1302. Each viewable map region 1302 includes one or more map objects 1304 (such as a street or road) which may be associated with a map object label 1306 such as a name of the street or road). Each viewable map region 1302 also includes one or more selectable map elements 1306 which are labeled in this example using letters A, B, C, D, E, F, and G. Each selectable map element 1308 may be a selectable point of interest (POI) indicator which corresponds to a point of interest (e.g. restaurants, stores, parks, selected locations, or other) for the end user. Some of all of the selectable POIs may be off-map indicators which corresponding to POIs which are not viewable. The map elements are "selectable" in the sense that they are selectable by the end user with use of the user interface while the viewable map region is displayed. The user interface operation may be that described earlier above in relation to FIG. 12.

Figure 13:
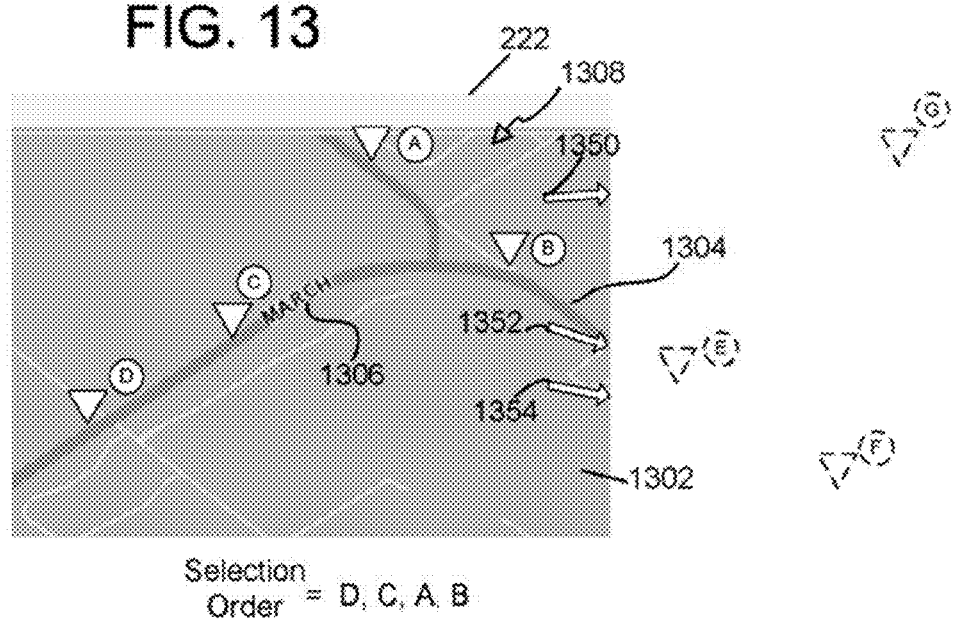
Figure 14:
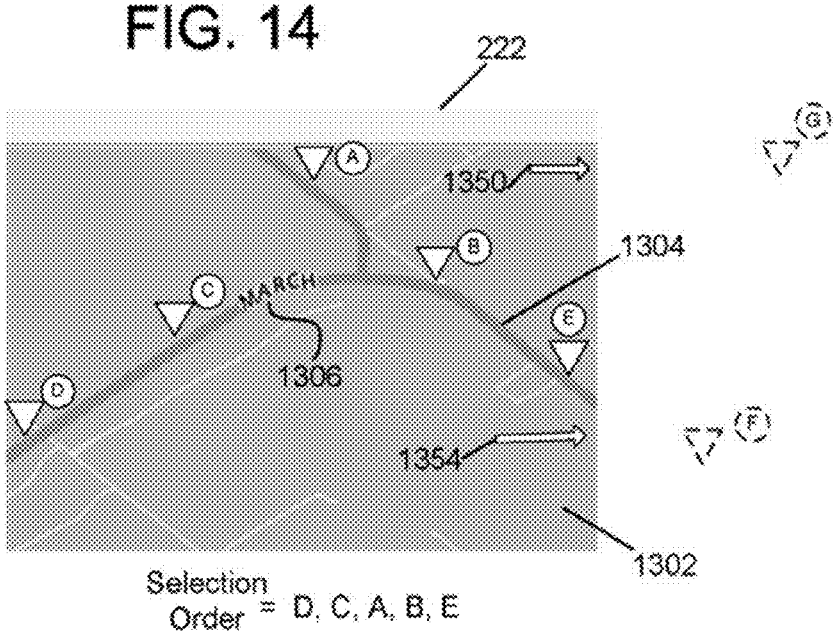
Figure 17:
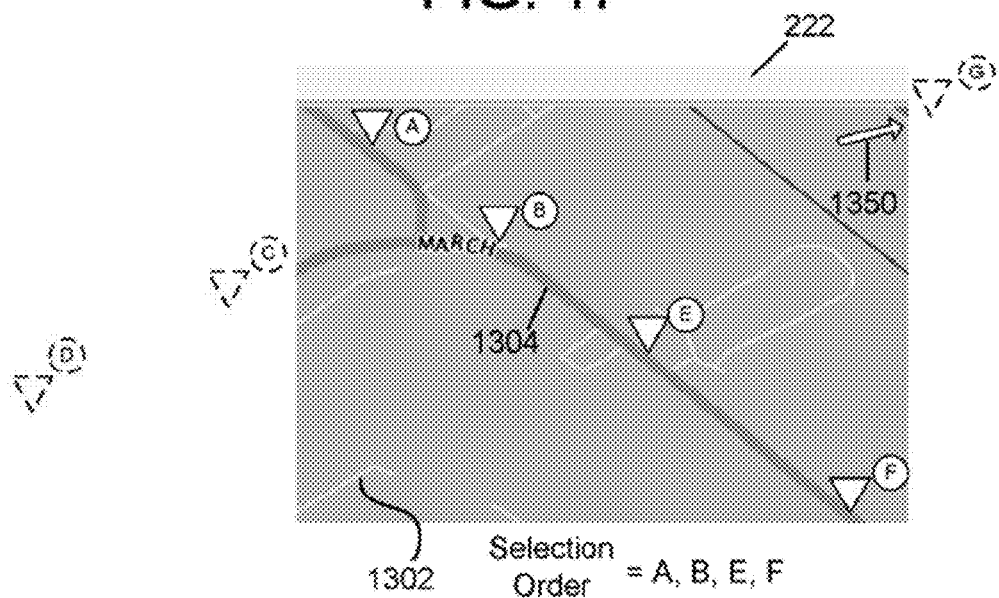
Figure 18:
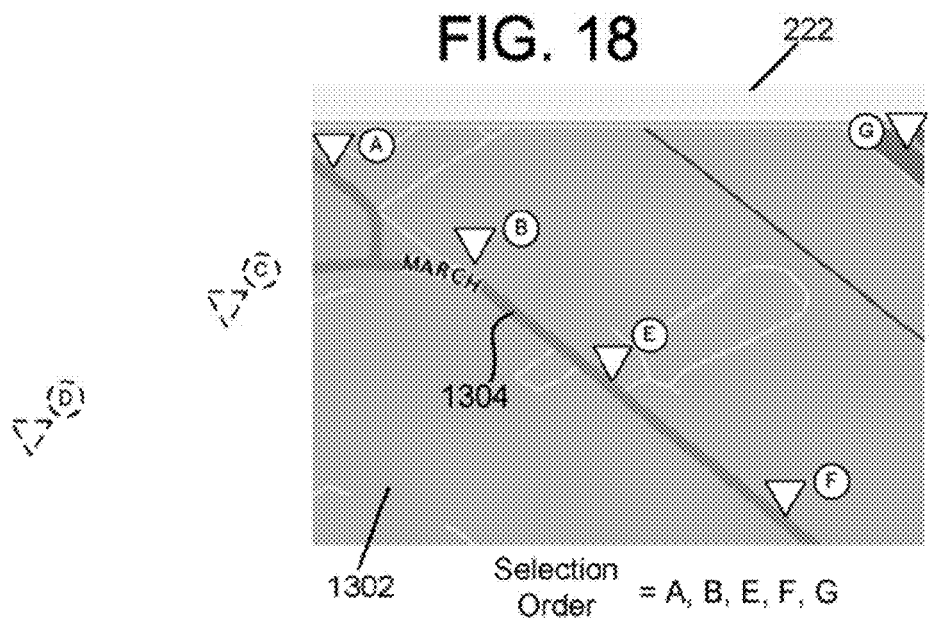
Figure 19:
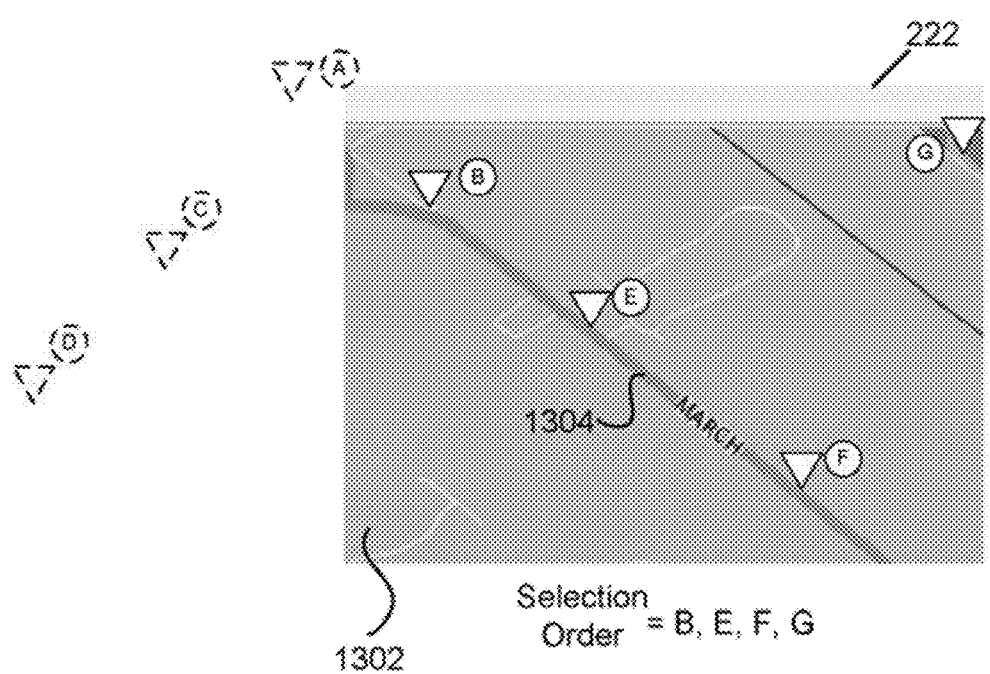

As shown in FIGS. 13-10, only some of the selectable map elements 1308 are positioned within view of the viewable map regions 1302 at any given time, depending on the particular view. In FIG. 13, selectable map elements A, B, C, and D are within the viewable map region, but elements E, F, and G are not. In FIG. 14, selectable map elements A, B, C, D, and E are within the viewable map region, but elements F and G are not. In FIG. 15, selectable map elements A, B, C, and E are within the viewable map region, but elements D, F, and G are not. In FIG. 16, selectable map elements A, B, and E are within the viewable map region, but elements C, D, F, and G are not. In FIG. 17, selectable map elements A, B, E, and F are within the viewable map region, but elements C, D, and G are not. In FIG. 18, selectable map elements A, B, E, F, and G are within the viewable map region, but elements C and D are not. Finally, in FIG. 19, selectable map elements B, E, F, and G are within the viewable map region, but elements A, C, and D are not.

Referring back to FIGS. 13-19 generally, and as described earlier above, the processor produces a list of element identifiers which includes selectable map elements 1308 that are viewable within viewable map region 1302. The selectable map elements have a designated order of selection that is based on an order of presentation of the selectable map elements in the viewable map region. In this example, the order may be based on an order of presentation of the selectable map elements in sequence from left to right of display 222. For each figure in FIGS. 13-19, a designated order of selection ("Selection Order") of the selectable map elements that are within viewable map region 1302 is provided. As apparent, for left/right positioning, the numeric order of the x-coordinates of the element identifiers dictate the selection order of the selectable map elements. The designated order of selection changes regularly depending on what selectable map elements are within the view.

The designated selection order for the viewable map regions in the example of FIGS. 13-19 is now described for "left/right" positioning. These designated selection orders are also shown in the figures themselves for the left/right positioning. In FIG. 13, the designated selection order of the selectable map elements is=D, C, A, B (the other map elements are not included as having a designated order of selection). In FIG. 14, the selection order is=D, C, A, B, and E (the other map elements are not included as having a designated order of selection). In FIG. 15, the selection order is=C, A, B, and E (the other map elements are not included as having a designated order of selection). In FIG. 16, the selection order is=A, B, and E (the other map elements are not included as having a designated order of selection). In FIG. 17, the selection order is=A, B, E, and F (the other map elements are not included as having a designated order of selection). In FIG. 18, the selection order is=A, B, E, F, and G (the other map elements are not included as having a designated order of selection). Finally, in FIG. 19, the selection order is=B, E, F, and G (the other map elements are not included as having a designated order of selection). The map elements are "selectable" in the designated order by the end user with use of the user interface its while the viewable map region is displayed. As apparent, for left/right positioning, the numeric order of the x-coordinates of the element identifiers dictate the selection order of the selectable map elements. The user interface operation may be that described earlier above in relation to FIG. 12.

The designated selection order for the viewable map regions in the example of FIGS. 13-19 is now further described for "up/down" positioning. In FIG. 13, the designated selection order of the selectable map elements is=A, B, C, D (the other map elements are not included as having a designated order of selection). In FIG. 14, the selection order is=A, B, C, E, D (the other map elements are not included as having a designated order of selection). In FIG. 15, the selection order is=A, B, C, E (the other map elements are not included as having a designated order of selection). In FIG. 16, the selection order is=A, B, and E (the other map elements are not included as having a designated order of selection). In FIG. 17, the selection order is=A, B, E, F (the other map elements are not included as having a designated order of selection). In FIG. 18, the selection order is=A, G, B, E, F (the other map elements are not included as having a designated order of selection). Finally, in FIG. 19, the selection order is=G, B, E, F (the other map elements are not included as having a designated order of selection). The user interface operation may be that described earlier above in relation to FIG. 12. As apparent, for up/down positioning, the numeric order of the y-coordinates of the element identifiers dictate the selection order of the selectable map elements.

Alternatively, for left/right positioning or up/down positioning, the numeric order of both the x and y coordinates of the element its identifiers may dictate the selection order of the selectable map elements.

Off-map indicators corresponding to map elements that are "off the map" (i.e. not viewable but within a predetermined range of location) may be provided in the display 222 and made selectable as well. Information and details may be provided for off-map indicators in the same or similar way as the other map elements. In FIGS. 13-19, off-map indicators 1350, 1352, and 1354 are shown in display 222 and correspond to map element G, map element E, and map element F, respectively. In this example, each off-map indicator has an arrow pointer which is oriented in the direction of the map element that is off the map. Preferably, only those map elements that are within a predetermined range of location have off-map indicators that are viewable within display. When a map element becomes viewable within display 222, its corresponding off-map indicator disappears. If off-map indicators are also made selectable within display 222, then element identifiers associated with the indicators may be included in the list and also have a designated order of selection using the same techniques described above.

Thus, the method described may include the steps of causing a viewable map region of the map to be visually displayed in the display, the viewable map region having a plurality of selectable map elements; maintaining a list of element identifiers which includes element identifiers associated with the selectable map elements; and controlling user interface operation for the viewable map region based on the list of element identifiers by monitoring to detect a forward direction positioning signal from a positioning mechanism of the user interface; in response to detecting the forward direction positioning its signal: causing a cursor in the display to be moved in a forward direction so as to select a next selectable map element in the viewable map region, but if a last selectable map element in the viewable map region is currently selected when the forward direction positioning signal is detected, causing the viewable map region of the map to be panned in the display in the forward direction; monitoring to detect a reverse direction positioning signal from the positioning mechanism; and in response to detecting the reverse direction positioning signal: causing the cursor in the display to be moved in a reverse direction opposite the forward direction so as to select a previous map element in the viewable map region, but if a first selectable map element in the viewable map region is currently selected when the reverse direction positioning signal is detected, causing the map to be panned in the display in reverse direction. The acts of controlling the user interface operation are repeated for each next viewable map region of the map (e.g. caused by panning, zooming, movement, etc.). In this approach, the order of selection may be determined based on at least one of a pair of coordinates associated with the selectable elements in the viewable map region. The coordinates may be based on the latitude and longitude coordinates of the selectable map element and/or the screen coordinates of the selectable map element. For example, x-coordinate positions of the selectable map elements may be utilized for selection order when panning along the x axis (e.g. left to right, right to left), and y-coordinate positions of the selectable map elements may be utilized for selection order when panning along the y-axis (e.g. up and down, down and up).

Figure 20:
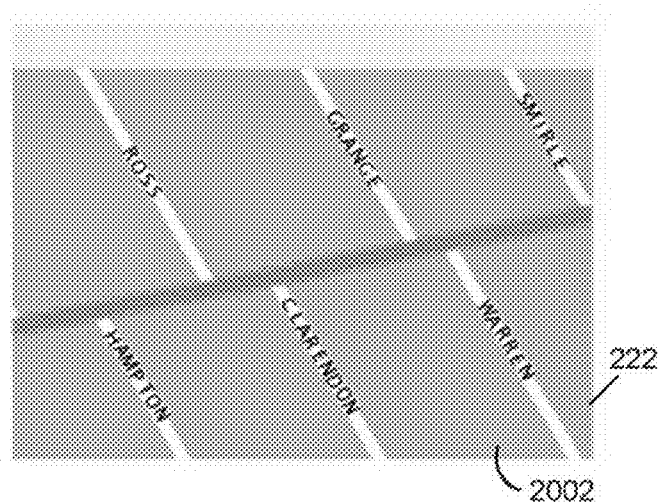
FIGS. 20-30 are sequential views of a plurality of viewable map regions of a map rendered in the display to illustrate another example.
Figure 21:
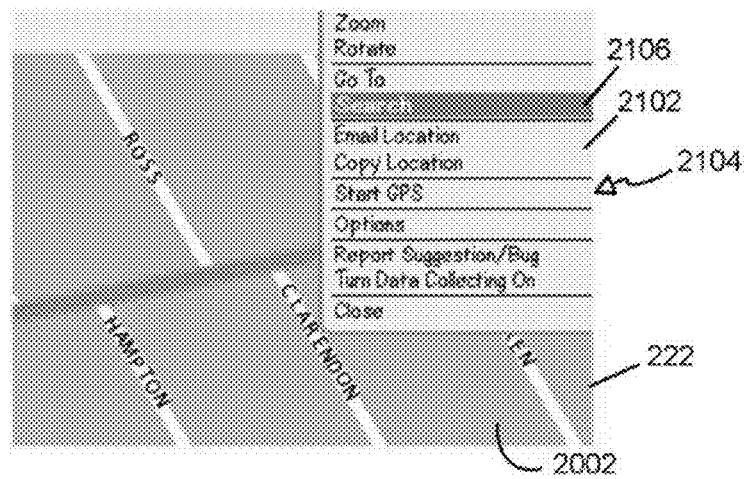
Figure 22:
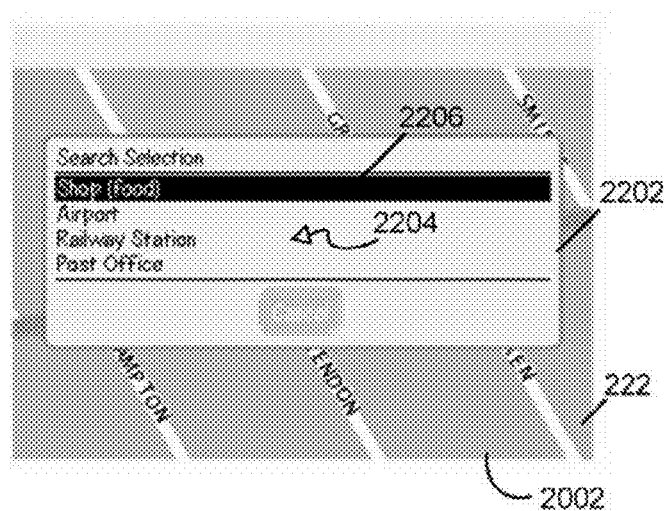

FIGS. 20-30 are sequential views of a plurality of viewable map regions of a map rendered in the display to illustrate more details regarding use of the selectable map elements as points of interest information. In FIG. 20, a viewable map region 2002 of a map is rendered in display 222. In response to a depression or actuation of the positioning mechanism by the end user during the display of viewable map region 2002, in FIG. 21 it is shown that a pop-up or pull-down list or menu 2102 having a plurality of function identifiers 2104 is displayed over a portion of viewable map region 2002. The end user may subsequently rotate the positioning mechanism to scroll the cursor up/down through the function identifiers 2104 of menu 2102 for highlighting the same one at a time. In FIG. 21, it is shown that the cursor is positioned so as to highlight a "Search" function identifier 2106 in menu 2102. In response to a depression or actuation of the positioning mechanism by the end user while Search function identifier 2106 is highlighted, in FIG. 22 the processor causes a sorting list 2202 having map information sort criteria 2204 to be displayed in display 222. The end user may subsequently rotate the positioning mechanism to scroll the cursor up/down through the map information sort criteria 2204 of sorting list 2202 for highlighting the same one at a time. In FIG. 22, it is shown that the cursor is positioned so as to highlight a "Shop (food)" sort criteria 2205.

Figure 23:
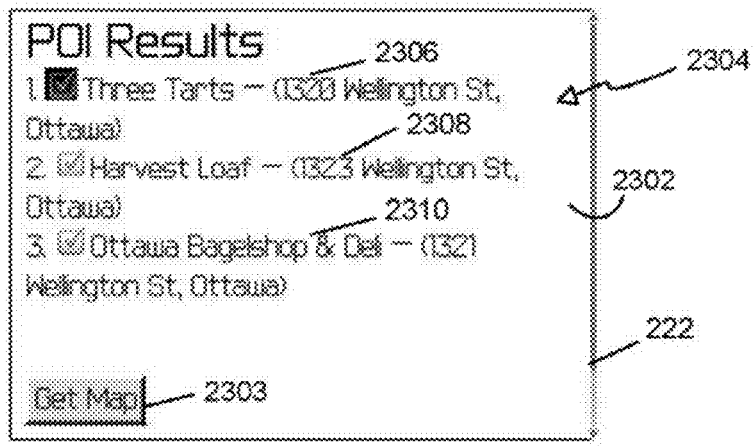
Figure 24:
Figure 25:
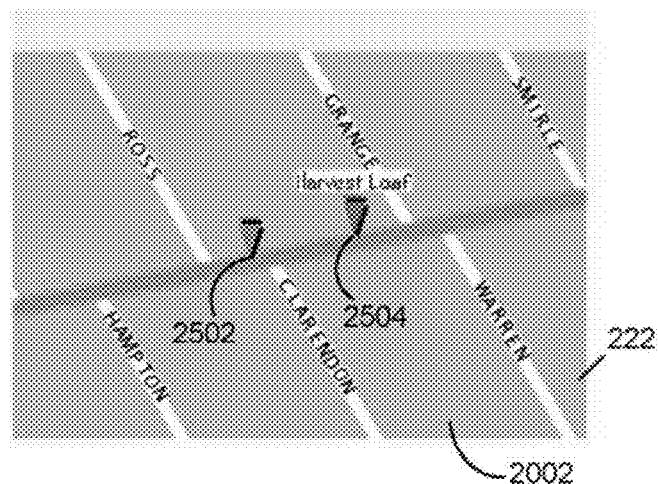
Figure 26:
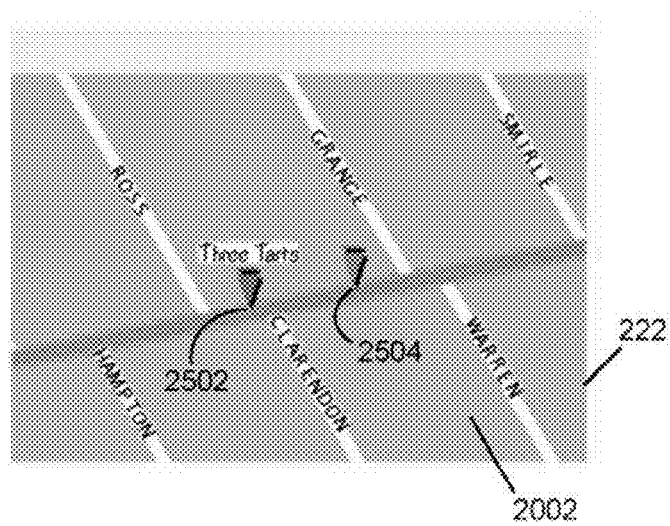

In response to a depression or actuation of the positioning mechanism by the end user while Shop (food) sort criteria 2206 is highlighted, in FIGS. 22-23 it is shown that the processor causes a search of information through a database to be performed based on the sort criteria, and subsequently a search result page 2302 having search results 2304 to be displayed in display 222. In this example, three search results 2304 have been identified; namely, a search its result 2306 corresponding to the "Three Tarts" restaurant (with address), a search result 2308 corresponding to the "Harvest Loaf" restaurant (with address), and a search result 2310 corresponding to the "Ottawa Bagelshop & Deli" restaurant (with address). The end user may subsequently rotate the positioning mechanism to scroll the cursor up/down through search results 2304 of search result page 2302 to mark/unmark the same one at a time. In FIG. 24, it is shown that the cursor is positioned so as to unmark the search result 2310. In response to a depression or actuation of the positioning mechanism by the end user while a "Get Map" function indicator 2303 is highlighted, in FIG. 25 it is shown that the processor causes viewable map region 2002 to again be displayed, but this time along with selectable map elements (e.g. POI indicators) corresponding to the search results (elements) marked from FIG. 24. In particular, a selectable map element 2502 corresponding to search result 2306 ("Three Tarts") is presented in viewable map region 2002 at its address location and a selectable map element 2504 corresponding to search result 2308 ("Harvest Loaf") is presented in viewable map region 2002 at its address location.

Figure 27:
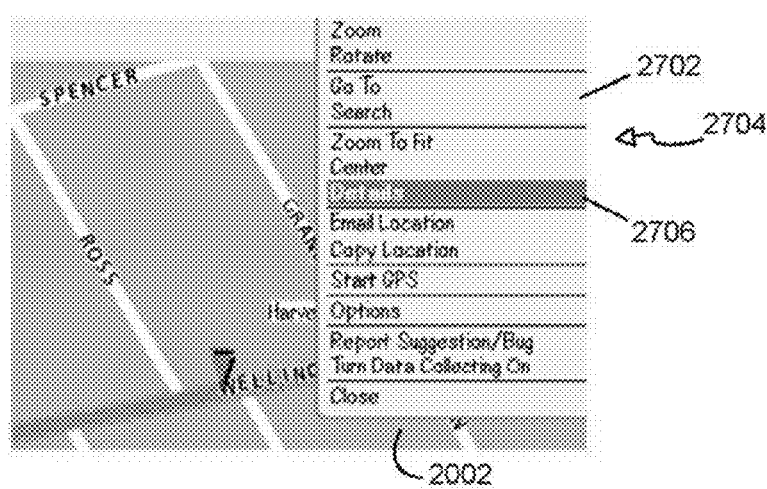

When a selectable map element is selected and/or highlighted, a name of the selectable map element is displayed; otherwise the name of the selectable map element is suppressed. See FIGS. 25-26, where in FIG. 25 selectable map element 2504 corresponding to "Harvest Loaf" is selected/highlighted and in FIG. 26 selectable map element 2502 corresponding to "Three Tarts" is selected/highlighted. When selectable map element 2504 corresponding to "Harvest Loaf" is selected/highlighted, in response to a depression or actuation of the positioning mechanism by the end user, in FIG. 27 it is shown that a pop-up or pull-down list or menu 2702 having a plurality of function identifiers 2704 is displayed over a portion of viewable map region 2002. The end user may subsequently rotate the positioning mechanism to scroll the cursor up/down through the function identifiers 2704 of menu 2702 for highlighting the same one at a time. In FIG. 27, it is shown that the cursor is positioned so as to highlight a "Details" function identifier 2706 in menu 2702. In response to a depression or actuation of the positioning mechanism by the end user while Details function identifier 2706 is highlighted, in FIG. 28 the processor causes a detailed information box 2202 regarding selectable map element 2504 to be displayed in display 222. Detailed information box 2202 includes detailed information 2804 including an address and telephone number of selectable map element 2904. Detailed information 2804 may include a selectable icon corresponding to a file associated with the POI, or a selectable hypertext link to view a webpage for additional information pertaining to the POI, as examples.

Figure 28:
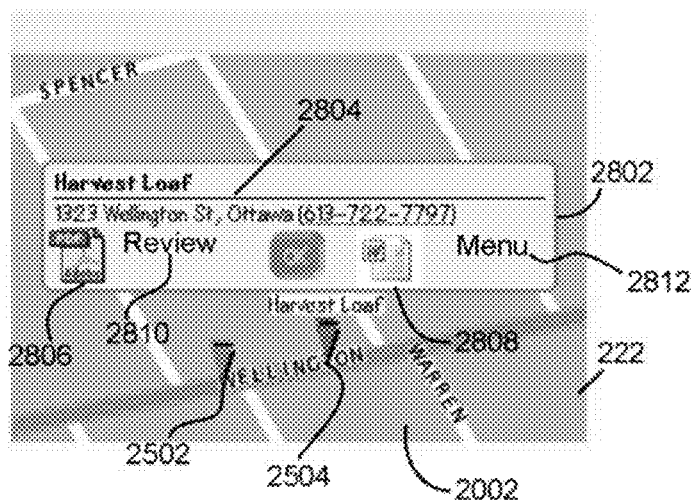
Figure 29:
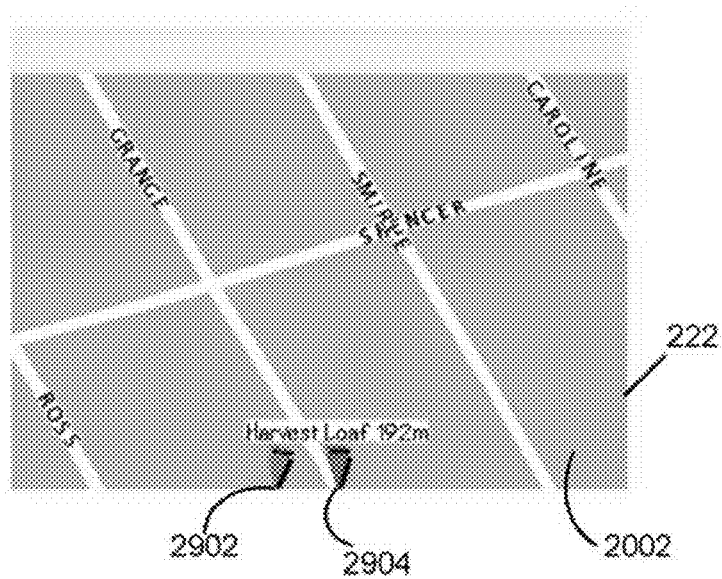
Figure 30:
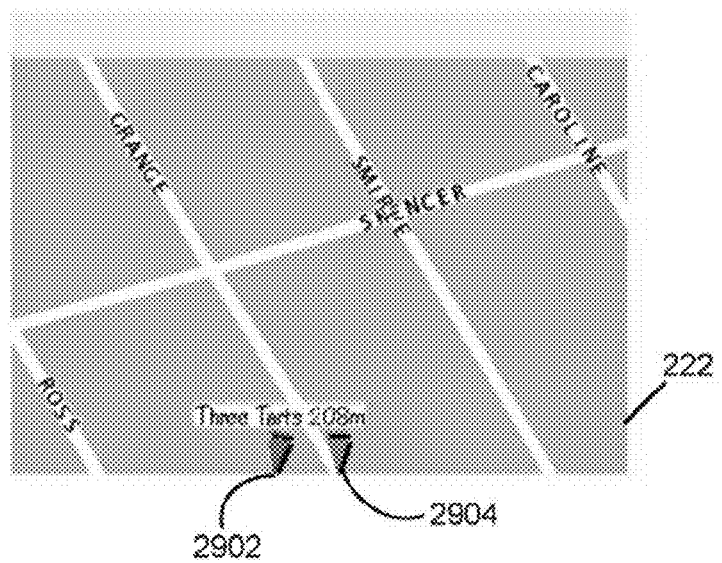

In FIGS. 29-30, the viewable map region is shown to be shifted upwards relative to FIGS. 27-28, such that the selectable map elements are now off the map. However, off-map indicators 2902 and 2904 corresponding to selectable map elements 2502, 2504 (FIG. 28), respectively, are positioned on a side and location of display 222 closest to their existence (e.g. at the bottom) and point in the direction of their existence. Off-map indicators 2902 and 2904 are also selectable map elements in display 222, as described previously. When off-map indicator 2904 is selected by the end user (FIG. 29), a distance (e.g. 192 meters) from a current location of the mobile device to the point of interest ("Harvest Loaf") is provided in display 222 adjacent the off-map indicator 2904. Similarly, when off-map indicator 2902 is selected by the end user (FIG. 30), a distance (e.g. 208 meters) from the current location of the mobile device to the point of interest ("Three Tarts") is provided in display 222 adjacent the off-map indicator 2902.

Thus, as described herein, one illustrative method for use in controlling user interface operation of a communication device when visually displaying a map involves the steps of causing a viewable map region of the map to be visually displayed in a display, the viewable map region having a plurality of selectable map elements; maintaining a list of element identifiers which includes element identifiers corresponding to the selectable map elements in the viewable map region, each element identifier being associated with a pair of x, y coordinates for visual display; controlling end user selection of the selectable map elements via a positioning mechanism in left and right directions in accordance with a numeric order of the x-coordinates; controlling end user selection of the selectable map elements via the positioning mechanism in up and down directions in accordance with a numeric order of the y-coordinates; and repeating the acts of causing, maintaining, and controlling for a next viewable map region of the map having a next plurality of selectable map elements.

Further, the end user selection may be controlled specifically by monitoring to detect a forward direction positioning signal from the positioning mechanism; in response to detecting the forward direction positioning signal: causing a cursor in the display to be moved in a forward direction so as to select a next selectable map element in the viewable map region, but if a last selectable map element in the viewable map region is currently selected when the forward direction positioning signal is detected, causing the viewable map region of the map to be panned in the display in the forward direction; monitoring to detect a reverse direction positioning signal from the positioning mechanism; and in response to detecting the reverse direction positioning signal: causing the cursor in the display to be moved in a reverse direction opposite the forward direction so as to select a previous map element in the viewable map region, but if a first selectable map element in the viewable map region is currently selected when the reverse direction positioning signal is detected, causing the map to be panned in the display in reverse direction.

The above-described embodiments of the present disclosure are intended to be examples only. Those of skill in the art may effect alterations, modifications and variations to the particular embodiments without departing from the scope of the invention. The invention described herein in the recited claims intends to cover and embrace all suitable changes in technology.

What is claimed is:

1. A method for use in controlling user interface operation of a communication device which includes a positioning mechanism, the method comprising:
   causing a viewable map region of a map to be visually displayed in a display;
   causing a plurality of point of interest (POI) indicators to be presented in the viewable map region;
   causing one or more off-map indicators to be presented in the viewable map region, each off-map indicator indicating a POI indicator which is outside of the viewable map region but within a predetermined range thereof;
   in response to detecting a forward direction positioning signal from the positioning mechanism when a cursor in the display is on a current POI or off-map indicator:
      when the cursor is on a topmost POI or off-map indicator, causing the viewable map region of the map to be panned in the display in the upwards direction;
      otherwise, causing the cursor in the display to be repositioned in an upwards direction onto a next POI or off-map indicator in the viewable map region without panning the viewable map region;
   in response to detecting a reverse direction positioning signal from the positioning mechanism when the cursor is on the current POI or off-map indicator:
      when the cursor is on a bottommost POI or off-map indicator, causing the map to be panned in the display in the downwards direction; and
      otherwise, causing the cursor in the display to be repositioned in a downwards direction onto a previous POI or off-map indicator in the viewable map region without panning the viewable map region.

2. The method of claim 1, wherein when the positioning mechanism is configured to provide leftwards and rightwards movement, controlling the user interface operation for the viewable map region by:
   in response to detecting a forward direction positioning signal from the positioning mechanism when the cursor is on the current POI or off-map indicator:
      when the cursor is on a rightmost POI or off-map indicator, causing the viewable map region of the map to be panned in the display in the rightwards direction;
      otherwise, causing the cursor in the display to be repositioned in a rightwards direction onto a next POI or off-map indicator in the viewable map region without panning the viewable map region;
   in response to detecting a reverse direction positioning signal from the positioning mechanism when the cursor is on the current POI or off-map indicator:
      when the cursor is on a leftmost POI or off-map indicator, then causing the map to be panned in the display in the leftwards direction; and otherwise, causing the cursor in the display to be repositioned in a leftwards direction onto a previous POI or off-map indicator in the viewable map region without panning the viewable map region.

3. The method of claim 2, further comprising:
receiving, via the user interface, an end user selection of one of a plurality of settings of the positioning mechanism which include a first setting for controlling the upwards and downwards movement and a second setting for controlling the leftwards and rightwards movement.

4. The method of claim 1, wherein an order of selection of the POI indicators in the forward and the reverse directions corresponding to leftwards and rightwards directions, respectively, is determined based on a numeric order of x-axis coordinates of the POI indicators.

5. The method of claim 1, wherein an order of selection of the POI indicators in the forward and the reverse directions corresponding to upwards and downwards directions, respectively, is determined based on a numeric order of y-axis coordinates of the POI indicators.

6. The method of claim 1, further comprising:
causing point of interest information for a POI indicator to be visually displayed in response to detecting a selection signal when the cursor is on the POI indicator.

7. The method of claim 1, wherein the positioning mechanism comprises a scrollwheel.

8. The method of claim 1, wherein the positioning mechanism comprises a trackball.

9. The method of claim 1, wherein the positioning mechanism comprises a touch screen display.

10. A non-transitory computer readable medium comprising computer instructions stored in the non-transitory computer readable medium which are executable by a processor to perform the method of claim 1.

11. A mobile communication device, comprising:
a wireless transceiver;
one or more processors coupled to the wireless transceiver;
a user interface coupled to the one or more processors and including a display and a positioning mechanism;
the one or more processors being configured to:
cause a viewable map region of a map to be visually displayed in the display;
cause a plurality of point of interest (POI) indicators to be presented in the viewable map region;
cause one or more off-map indicators to be presented in the viewable map region, each off-map indicator indicating a POI indicator which is outside of the viewable map region but within a predetermined range thereof;
in response to detecting a forward direction positioning signal from the positioning mechanism when a cursor in the display is on a current POI or off-map indicator:
when the cursor is on a topmost POI or off-map indicator, cause the viewable map region of the map to be panned in the display in the upwards direction;
otherwise, cause the cursor in the display to be repositioned in an upwards direction onto a next POI or off-map indicator in the viewable map region without panning the viewable map region;
in response to detecting a reverse direction positioning signal from the positioning mechanism when the cursor is on the current POI or off-map indicator:
when the cursor is on a bottommost POI or off-map indicator, cause the map to be panned in the display in the downwards direction; and
otherwise, cause the cursor in the display to be repositioned in a downwards direction onto a previous POI or off-map indicator in the viewable map region without panning the viewable map region.

12. The mobile communication device of claim 11, wherein when the positioning mechanism is configured to provide leftwards and rightwards movement, the one or more processors being further configured to:
in response to detecting a forward direction positioning signal from the positioning mechanism when the cursor is on the current POI or off-map indicator:
when the cursor is on a rightmost POI or off-map indicator, cause the viewable map region of the map to be panned in the display in the rightwards direction;
otherwise, cause the cursor in the display to be repositioned in a rightwards direction onto a next POI or off-map indicator in the viewable map region without panning the viewable map region;
in response to detecting a reverse direction positioning signal from the positioning mechanism when the cursor is on the current POI or off-map indicator:
when the cursor is on a leftmost POI or off-map indicator, then cause the map to be panned in the display in the leftwards direction; and
otherwise, cause the cursor in the display to be repositioned in a leftwards direction onto a previous POI or off-map indicator in the viewable map region without panning the viewable map region.

13. The mobile communication device of claim 12, wherein the one or more processors are further configured to:
receive, via the user interface, an end user selection of one of a plurality of settings of the positioning mechanism which include a first setting for controlling the upwards and downwards movement and a second setting for controlling the leftwards and rightwards movement.

14. The mobile communication device of claim 11, wherein an order of selection of the POI indicators in the forward and the reverse directions corresponding to leftwards and rightwards directions, respectively, is determined by the one or more processors based on a numeric order of x-axis coordinates of the POI indicators.

15. The mobile communication device of claim 11, wherein an order of selection of the POI indicators in the forward and the reverse directions corresponding to upwards and downwards directions, respectively, is determined by the one or more processors based on a numeric order of y-axis coordinates of the POI indicators.

16. The mobile communication device of claim 11, wherein the one or more processors are further configured to:
cause point of interest information for a POI indicator to be visually displayed in the display in response to detecting a selection signal when the cursor is on the POI indicator.

17. The mobile communication device of claim 11, wherein the positioning mechanism comprises a scrollwheel.

18. The mobile communication device of claim 11, wherein the positioning mechanism comprises a trackball.

19. The mobile communication device of claim 11, wherein the positioning mechanism comprises a touch screen display.

20. The mobile communication device of claim 11, comprising a cellular telephone.

* * * * *